(12) United States Patent
Berard

(10) Patent No.: US 8,694,284 B2
(45) Date of Patent: Apr. 8, 2014

(54) PART MODELED BY PARALLEL GEODESIC CURVES

(75) Inventor: Simon Berard, Issy les Moulineaux (FR)

(73) Assignee: Dassault Systemes, Velizy Villacoublay, Cedex (FR)

(*) Notice: Subject to any disclaimer, the term of this patent is extended or adjusted under 35 U.S.C. 154(b) by 467 days.

(21) Appl. No.: 13/070,547

(22) Filed: Mar. 24, 2011

(65) Prior Publication Data

US 2012/0072182 A1 Mar. 22, 2012

(30) Foreign Application Priority Data

Apr. 2, 2010 (EP) .................................... 10305344

(51) Int. Cl.
*G06F 17/50* (2006.01)

(52) U.S. Cl.
USPC .............................................. 703/1; 345/419

(58) Field of Classification Search
USPC ............................................................ 703/1
See application file for complete search history.

(56) References Cited

U.S. PATENT DOCUMENTS

| | | | |
|---|---|---|---|
| 6,256,038 B1 * | 7/2001 | Krishnamurthy | 345/419 |
| 7,471,848 B2 * | 12/2008 | Fujimoto et al. | 382/275 |
| 2003/0227454 A1 | 12/2003 | Kellermann et al. | |
| 2010/0170989 A1 * | 7/2010 | Gray | 244/123.1 |

OTHER PUBLICATIONS

Ulmet, Dan-Eugen, "Geodesic Offsets of Spline Curves on Spline Surfaces an Industrial Perspective", Proceedings of the 24th National Conference of Geometry and Topology, Jul. 5-9, 1994.*

Miao et al, "3D Face Recognition Based on Evolution of Iso-Geodesic Distance Curves", IEEE International Conference on Acoustics Speech and Signal Processing, Mar. 14-19, 2010.*
Hatna et al, "Offsetting 3D Contours on Parametric Surfaces", Int. J. Manufacturing Technology, 16, pp. 189-195, 2000.*
Wang et al, "The Draping of Woven Fabric Preforms and Prepegs for Production of Polymer Composite Components", Composites: Part A, pp. 757-765, 1999.*
Dassault Systemes, "Generative Shape Design", 1994-1999.*
Elber et al, "Adaptive Isocurve Based Rendering for Freeform Surfaces", Department of Computer Science, University of Utah, Dec. 2, 1992.*
Patrikalakis et al, "Offsets of Curves on Rational B-Spline Surfaces", Engineering with Computers 5, pp. 39-46, 1989.*
Tam et al, "A Geometric Approach to the Offsetting of Profiles on Three-Dimensional Surfaces", Computer-Aided Design 36, pp. 887-902, 2004.*

(Continued)

*Primary Examiner* — Mary C Jacob
(74) *Attorney, Agent, or Firm* — Hamilton, Brook, Smith & Reynolds, P.C.

(57) ABSTRACT

The invention provides a computer implemented method for designing a part. The method comprises a step of providing a surface and a base curve lying on the surface. The method also comprises a step of sampling the base curve into a list of base points. The method also comprises a step of determining a grid of points of perpendicular geodesic curves. The points of the grid each belong to a respective level. Each level of the grid corresponds to a respective geodesic distance to the base curve. Each perpendicular geodesic curve lies on the surface and departs perpendicularly from the base curve at a respective base point. The method then comprises a step of computing a plurality of parallel geodesic curves lying on the surface by using the grid of points. Each parallel geodesic curve corresponds to a respective level. A representation of the part is displayed.

14 Claims, 15 Drawing Sheets

(56) References Cited

OTHER PUBLICATIONS

European Search Report of EP 10305344 dated Aug. 26, 2010.

Maekawa, T., "An Overview of Offset Curves and Surfaces," Computer-Aided Design, 31:3 pp. 165-173, Mar. 1, 1999.

Zhu, F., et al. "A CAD Modeling System for Components Made of Multi Heterogeneous Materials" Proceedings of ETFA '03, IEEE Conference, Piscataway, NJ, vol. 1, pp. 559-565, Sep. 16-19, 2003.

Aouada, D., "Meaningful 3D Shape Partitioning Using Morse Functions," 16th IEEE International Conference on Image Processing (ICIP) 2009, Piscataway, NJ, pp. 417-420, Nov. 7, 2009.

Ying, L, et al., "The Phase Flow Method", Journal of Computational Physics 220, pp. 184-215, 2006; www.sciencedirect.com; retrieved from internet Apr. 1, 2011.

Ying, L., et al. "Fast Geodesics Computation with the Phase Flow Method", Applied Computational Mathematics, California Institute of Technology, Pasadena, CA , 13 pages, Jan. 2006.

www.vistagy.com/products/fibersim-composiste-environments. aspx "Vistagy, FiberSIM: The Worlds Leading Software for Composites", 2 pages, retrieved from internet Apr. 1, 2011.

http://www.3ds.com/products/catia/welcome/ "CATIA V5R20—Fact Sheet Virtual Design for product Excellence" (2010), 11 pages, retrieved from internet Apr. 1, 2011.

Do Carmo, Manfredo P., "Differential Geometry of Curves and Surfaces" Prentice Hall, Inc., 1976, pp. iii and iv.

\* cited by examiner

```
d_0 := d
For i := 1 to m d_0 begin
C_j := GeodesicParallelCurve(Surface, BaseCurve, d_0)
       d_0 := d_0 + d
End for
```
FIG. 6
```
C_0 := BaseCurve
For i := 1 to m d_0 begin
       C_j := GeodesicParallelCurve(Surface, C_{j-1}, d)
End for
```
FIG. 7
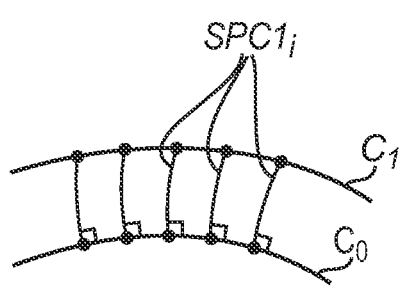
FIG. 8
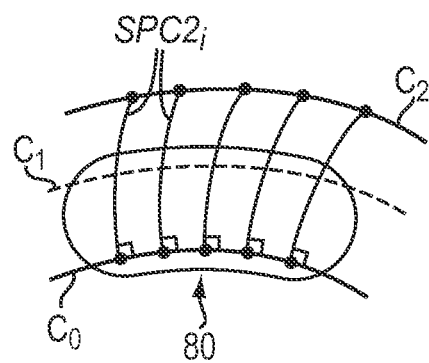
FIG. 9

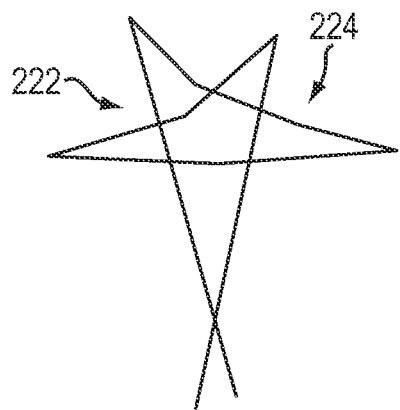 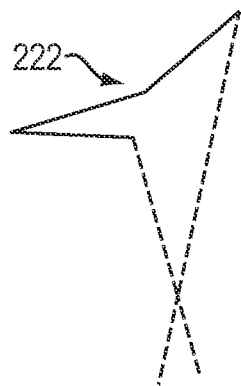 
FIG. 22  FIG. 23  FIG. 24
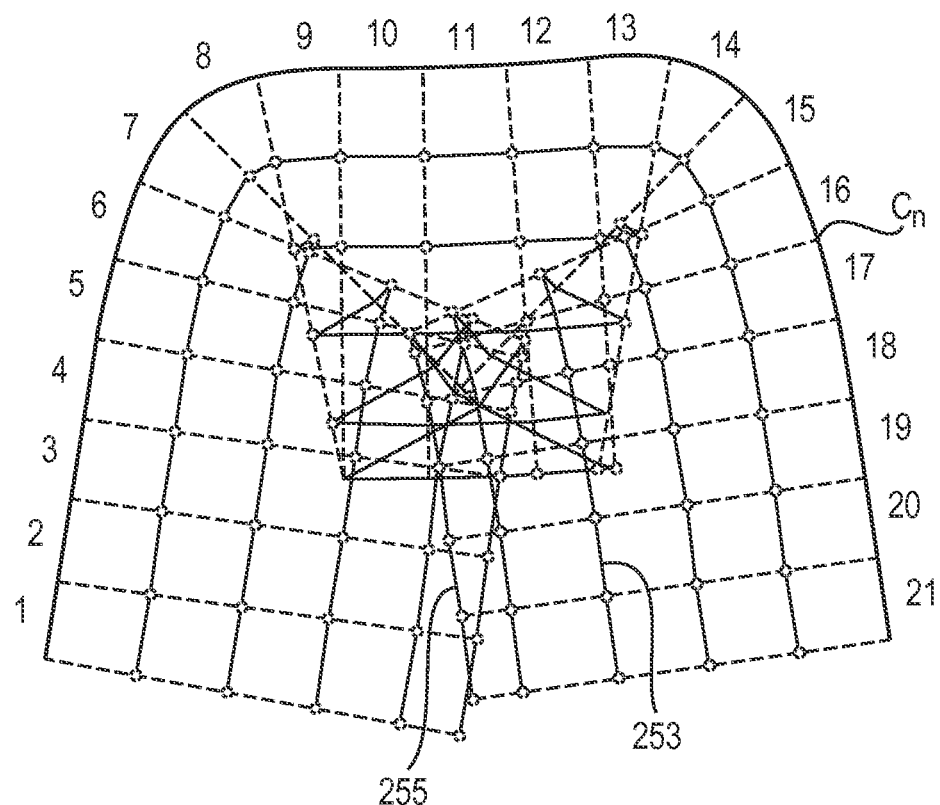
FIG. 25

PART MODELED BY PARALLEL GEODESIC CURVES

RELATED APPLICATION(S)

This application claims priority under 35 U.S.C. §119 or 365 to European, Application No. 10305344.3, filed Apr. 2, 2010.

The entire teachings of the above application(s) are incorporated herein by reference.

FIELD OF THE INVENTION

The invention relates to the field of computer programs and systems, and more specifically to a computer implemented method for designing a part.

BACKGROUND OF THE INVENTION

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systèmes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique. Most of the operations required for manipulating and/or navigating the modeled objects may be performed by the user (e.g. the designers) on the GUI. Especially, the user may create, modify, and delete the modeled objects forming the product, and also explore the product so as to comprehend how modeled objects are interrelated, e.g. via a product structure. Traditionally, these operations are carried out through dedicated menus and icons which are located on the sides of the GUI. Recently, CAD systems such as CATIA allow calling these functions nearby the representation of the product. The designer does not need anymore to move the mouse towards menus and icons. Operations are thus available within reach of the mouse. In addition, the operations behave semantically: for a given operation selected by the designer, the CAD system may suggests to the designer, still nearby the mouse, a set of new operations according to the former selected operation that the designer is likely to select.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). The digital product may be first defined and simulated using an appropriate application. Then, the lean digital manufacturing processes may be defined and modeled.

The PLM solutions provided by Dassault Systemes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way.

In particular, the design of parts has involved many mathematical developments. For example, the use geodesic curves and parallel geodesic curves has been already implemented by prior art to design surface parts, i.e. parts presenting a surface, or surfaces of such parts. In the following, some definitions and developments known from prior art are provided before presenting issues related to the computation of a parallel geodesic curve.

Given a smooth surface, $S(u,v)$, $(u,v)\epsilon[a,b]\times[c,d]$, given two points $P_0=(u_0,v_0)$ and $P_1=S(u_1,v_1)$ on this surface, a curve on surface S joining these two points may be defined by a p-curve $t \mapsto (u(t),v(t))$ from an interval $[t_0,t_1]$ to $[a,b]\times[c,d]$ such that $(u(t_0),v(t_0))=(u_0,v_0)$ and $(u(t_1), v(t_1))=(u_1,v_1)$. The 3D curve on surface S associated to the p-curve is the curve from interval $[t_0,t_1]$ to the 3D space $R^3$ defined by $C(t)=S(u(t),v(t))$. By definition, the geodesic distance between points $P_0$ and $P_1$ is the length of the shortest curve on surface S joining the two points. By definition, the geodesic curve joining points $P_0$ and $P_1$ is this shortest curve C. By construction, $C(t_0)=P_0$ and $C(t_1)=P_1$. The length of curve C is defined by the following integral:

$$\int_{t_0}^{t_1} \|C'(t)\| dt$$

where C'(t) is the tangent vector of curve C and $\|\ \|$ denotes the Euclidian norm of vectors. The tangent vector C'(t), and thereby the length of curve C, are closely related to the surface through its partial derivatives, as computed below.

$$C'(t) = \frac{d}{dt} S(u(t), v(t)) = S_u(u(t), v(t))u'(t) + S_v(u(t), v(t))v'(t)$$

Symbol $S_u$ is a compact notation for the partial derivative $$\frac{\partial S}{\partial u}.$$

It should be noted that another formulation involves the curve energy $$\int_{t_0}^{t_1} \|C'(t)\|^2 dt$$

instead of the curve length $$\int_{t_0}^{t_1} \|C'(t)\| dt.$$

It can be proven that these two formulations provide the same geodesic curve.

For example, with reference to FIG. 1, given two points $P_0$ and $P_1$ on a spherical surface S, the geodesic curve C joining the two points is the intersection of the said spherical surface and the plane through the two points and the center of the sphere, yielding an arc of circle joining the two points.

This definition is the start point of differential geometry. The "minimum length" or "minimum energy" definition of geodesic curves leads, thanks to the "calculus of variations" theory, to a second order differential equation that characterizes the geodesic curve. Let us rewrite the minimized criteria:

$$\int_{t_0}^{t_1} E(u(t), v(t), u'(t), v'(t)) dt$$

where $E(u,v,u',v')=\|S_u(u,v)u'+S_v(u,v)v'\|^2$ and u,v are the unknown functions. Then, the calculus of variations states that the solution of the minimization problem is also the solution of the following Euler-Lagrange differential equation:

$$\frac{\partial E}{\partial u} - \frac{d}{dt}\frac{\partial E}{\partial u'} = 0$$
$$\frac{\partial E}{\partial v} - \frac{d}{dt}\frac{\partial E}{\partial v'} = 0$$

A straightforward computation states that the differential equation of the geodesic curve has the following shape:

u''=p(u,v,u',v')

v''=q(u,v,u',v')

where right hand terms p(u,v,u',v') and q(u,v,u',v') involve the first and second partial derivatives of surface S. Explicit formulas for p(u,v,u',v') and q(u,v,u',v') are classical results of prior art that are not needed for the understanding of the present explanations. This differential equation allows defining a geodesic curve by a point and a direction by setting $(u(t_0),v(t_0))=(u_0,v_0)$ and $(u'(t_0),v'(t_0))=(u'_0,v'_0)$ rather than two end points. For a more comprehensive review, a classical reference in this field is the textbook written by M. F. do Carmo and entitled "Differential geometry of curves and surfaces", Prentice Hall.

The bottom line is that the creation of a geodesic curve in a CAD system requires numerical integration of a differential equation. The coefficients of this differential equation involve the first and second partial derivatives of the surface on which the geodesic curve is computed.

Computing a parallel geodesic curve is even more complicated. Given a base curve B(t)=S(u(t),v(t)) on the surface (a user defined curve, not necessarily a geodesic curve), and given a distance value d, the parallel geodesic curve of the base curve is the set of points on the surface lying at distance d from the basic curve, in the geodesic distance meaning. In other words, a parallel geodesic curve is a curve of the surface parallel to the base curve in the geodesic distance meaning. A known algorithm to compute a parallel geodesic curve is provided in the following with reference to FIGS. 2-4:

Evaluate n base points $B(t_i)$ on the base curve $C_0$ noted $B_i$ (this step is represented on FIG. 2);

For each base point $B_i$, compute the direction $D_i$ that is perpendicular to the tangent of the base curve $B'(t_i)$ (two directions $D_i$, the ones corresponding to point $B_1$ and $B_2$, are represented with arrows on FIG. 3);

Compute the geodesic curve of length d, starting at point $B_i$ in the direction $D_i$. This curve $SPC_i$ is called the geodesic perpendicular curve at point $B_i$. Let us note $P_i$ the end point of this geodesic perpendicular curve (the geodesic perpendicular curves $SPC_i$ are represented on FIG. 3 as the curves linking a point $B_i$ of the base curve to a respective point $P_i$);

All points $P_i$ belong to the parallel geodesic curve. As represented on FIG. 4, a smooth curve $C_1$ as the parallel geodesic curve is created through these points in order to provide the designer with a geometrical result.

CATIA V5 system implements the previous algorithm in the "Create Parallel Curve" function of "Generative Shape Design" product. The designer selects an input surface, an input curve on said input surface, sets the offset distance value and selects the "geodesic" option (as opposed to the "euclidean" option in the dialog box). Then, CATIA system generates the geodesic parallel curve of the input curve on the input surface.

FiberSIM® software product of Vistagy Inc. is a very popular specialized CAD tool to design composites. This software similarly computes parallel geodesic curves. It is based on CAA (CATIA Application Architecture) platform of Dassault Systems. No patent or publication related to this product or this company seems to be published so far.

The prior art cited above provides a way to compute a single parallel geodesic curve to design a part.

The papers "Fast geodesic computation with the phase flow method" and "The phase flow method" by L. Ying and E. J. Candes from the California Institute of Technology in Pasadena provide a way to massively compute a network of geodesic curves. The algorithm is to evaluate the vector field of the differential equation on a grid of points and to interpolate off-grid vector field values by interpolating neighboring values. For vocabulary purpose, the "vector field" is the right hand side of the differential equation. However, these papers do not mention the design of parts. The algorithm they disclose computes a network of geodesic curves starting from a given point. It is also noted that the algorithm only provides approximate values when the vector field is evaluated on points that do not belong to the grid.

US patent application "process and computer system for generating a multidimensional offset surface" Ser. No. 10/441,287, by H. Kellermann et al. from CoCreate Software GmbH company, teaches a solution to compute an offset curve from a base curve. According to the authors, the resulting offset curve does not feature any self intersection when the base curve features small oscillations; "small" meaning that the local curvature radius is lower than the offset distance. The principle is to approximate the base curve by a smooth and flattened curve, thus eliminating tiny oscillations from the base curve, as mentioned at paragraph [0013] of the patent application as published. In order to determine the approximation normal, an approximation curve is generated the position and course of which are approximate to the position and course of the starting curve. Advantageously, this approximation is obtained by smoothing the starting curve. The final offset curve is computed from this (approximated, smooth and flattened) base curve through a straightforward process, yielding a non singular offset curve. However, the offset curve in this patent application is not a geodesic parallel curve.

There is a need for improving the design of parts, notably the design of surface part by offering a new design option to the designer.

SUMMARY OF THE INVENTION

This aim is achieved with a computer implemented method for designing a part comprising the steps of providing a surface and a base curve lying on the surface; sampling the base curve into a list of base points; determining a grid of points of perpendicular geodesic curves, the points belonging to a respective level, each level corresponding to a respective geodesic distance to the base curve, wherein each perpendicular geodesic curve lies on the surface and departs perpendicularly from the base curve at a respective base point; then, computing a plurality of parallel geodesic curves lying on the surface by using the grid of points, each parallel geodesic curve corresponding to a respective level; and displaying a representation of the part.

Preferred embodiments may comprise one or more of the following features:
- the step of computing the plurality of parallel geodesic curves comprises interpolating the points of each level, or fitting the points of each level;
- the method further comprises modifying one or more levels;
- the step of computing the plurality of parallel geodesic curves comprises interpolating the points of each level with a polygonal line, the polygonal line comprising segments formed over a sequence of points of the level; and the modifying of one or more levels comprises discarding at least one segment of the level under modification;
- the modifying of one or more levels comprises forming vectors corresponding to segments of the level under modification, each vector having a start point and an end point, the formed vector having a corresponding base vector, formed by two points of the base curve corresponding to the start point and the end point respectively; evaluating if the formed vectors are oriented in a same direction as the corresponding base vectors; upon the result of the step of evaluating, determining regular segments and irregular segments of the sequence, an irregular segment being a segment which corresponds to a vector evaluated to be oriented in a different direction from the corresponding base vector; and discarding the irregular segments from the level under modification;
- the modifying of one or more levels further comprises forming vectors corresponding to segments of at least one other level, the formed vectors of the other level having corresponding base vectors; evaluating if the formed vectors of the other level are oriented in a same direction as the corresponding base vectors; upon the result of the step of evaluating for the other level, discarding regular segments from the level under modification;
- the modifying of one or more levels further comprises determining an intersection between a first polygonal branch and a second polygonal branch, the intersection being the shortest line linking the first polygonal branch and the second polygonal branch; and discarding all the segment of the first polygonal branch after the intersection and all the segments of the second polygonal branch before the intersection; wherein the first polygonal branch and the second polygonal branch, each being a sequence of regular segments of the level under modification, are separated by a sequence of previously discarded segments of the level;
- the modifying further comprises adding to the level under modification a leader point located on the intersection, preferably located on the middle of the intersection,
- the base curve comprises a sharp vertex; and the modifying comprises adding at least one point to the level under modification, according to the position of two points of the level corresponding to two base points of the base curve on either side of the sharp vertex;
- the grid of points is dynamically refined;
- the part is a composite part; and
- at least one parallel geodesic curve comprises a sharp vertex.

This aim is also achieved with a computer-aided design system comprising a database suitable for storing parameterizations of a surface and a base curve lying on the surface; and a graphical user interface suitable for designing a part with the above method.

This aim is also achieved with a computer program comprising instructions for execution by a computer, the instructions comprising means for causing a computer-aided design system comprising a database, suitable for storing parameterizations of a surface and a base curve lying on the surface, to perform the above method.

This aim is also achieved with a computer readable storage medium having recorded thereon the above computer program.

Further features and advantages of the invention will appear from the following description of embodiments of the invention, given as non-limiting examples, with reference to the accompanying drawings listed hereunder.

BRIEF DESCRIPTION OF THE DRAWINGS

FIGS. 6-11 show an example of an adaptation of the prior art method of FIGS. 2-4 to compute a plurality of parallel geodesic curves.

FIGS. 13-25 show examples of one type of singularity.

DETAILED DESCRIPTION OF THE INVENTION

Figure 1:
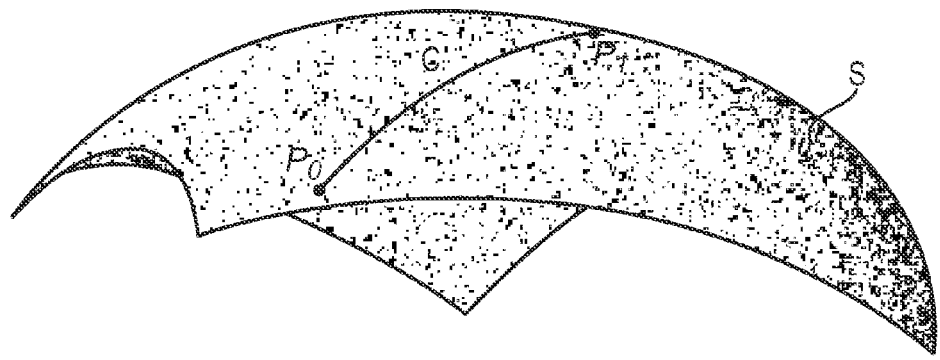
FIG. 1 shows a geodesic curve on a sphere surface.

A computer implemented method according to the invention is intended for designing a part. The method comprises a step of providing a surface and a base curve lying on the surface. The method also comprises a step of sampling the base curve into a list of base points. The method also comprises a step of determining a grid of points of perpendicular geodesic curves. The points of the grid each belong to a respective level. Each level of the grid corresponds to a respective geodesic distance to the base curve. Each perpendicular geodesic curve lies on the surface and departs perpendicularly from the base curve at a respective base point. The method then comprises a step of computing a plurality of parallel geodesic curves lying on the surface by using the grid of points. Each parallel geodesic curve corresponds to a respective level. A representation of the part is displayed according to the method. Such a method offers a new way to design a part.

The method according to the invention is intended for designing a part. The term "part" generally refers to a mechanical component of an industrial product. However, many variations are possible within the scope of the invention. For example, the method may also be used for designing an assembly of parts, possibly an entire industrial product (e.g. a wing of a plane). Furthermore, the invention is not solely intended to the design of mechanical parts, but it is applicable to any field where computer design is required. For example, the invention is applicable to the field of video games.

The method will now be detailed with reference to the flowchart of FIG. 5.

The method comprises a step of providing S1 a surface and a base curve lying on the surface. Providing a surface typically includes providing identification and/or geometric specifications, such as parameterization, of a surface. Similarly, providing a base curve typically includes providing identification and/or geometric specifications, such as parameterization, of a curve. Such identifications and specifications may be any one known from prior art.

For instance, the surface may be identified as surface S and may be specified by the parameterization $S(u, v)$, $(u, v) \in [a,b] \times [c,d]$, wherein a, b, c and d are real numbers. However, other specifications may alternatively or additionally be provided and are within the scope of the method. This includes for example specifications such as "the plane which interpolates the following points", or "the sphere which interpolates the following circles", or such as an optimization problem of which solution is a surface.

The curve may be identified as base curve $C_0$. The curve lies on the surface. In other words, if a point belongs to the curve, then it also belongs to the surface. The base curve may thus be conveniently specified by a p-curve $t \mapsto (u(t), v(t))$ from an interval $[t_0, t_1]$ to $[a,b] \times [c,d]$. The base curve on surface S is then the curve from interval $[t_0, t_1]$ to the 3D space $R^3$ defined by $C(t)=S(u(t), v(t))$ associated to the p-curve. However, other specifications may alternatively or additionally be provided and are within the scope of the method. For example, the base curve may also be specified by a direct parameterization in the 3D space $R^3$, such as $t \mapsto (x(t), y(t), z(t))$. Also, the method may further comprise a step of projecting on the surface a curve originally not lying on the surface, thereby providing a base curve lying on the surface. In that case, the base curve may be specified by the initial curve and the direction of projection. The base curve is in the general case any curve lying on the surface. It may in particular be a geodesic curve of the surface.

Providing S1 a surface and a base curve lying on the surface may be semi-automatically or manually performed. It may involve the designer. Typically and as known from prior art, when designing a part, it is often required that a designer provides a CAD system with geometric specifications. Such specifications may include parameters for defining a surface and a base curve lying on the surface. Alternatively, the designer may only select an area of an object already existing in a CAD system. The CAD system may then compute from that area a parameterization of a surface and/or a curve without the designer being made aware of the parameters. Alternatively, the designer may select a surface and/or a curve from a default list proposed to him by a CAD system. The surface and/or the base curve may also be provided by a collaborating designer. The above methods may be used in combination. For example, the surface may be provided by selecting an area of an object in the system and the base curve may be provided by specifying a p-curve on the surface.

As can be understood from the many alternatives detailed above, the step of providing S1 a surface and a base curve lying on the surface encompasses many alternatives, as long as the system with which the method is performed has enough information on a surface and a base curve for performing the subsequent steps of the method.

The method also comprises a step of sampling S2 the base curve into a list of base points. Sampling the base curve into a list of base points consists in creating points of the curve and determining their position. The position may be determined by coordinates, or values for parameters of the curve, or any convenient means to perform computations required in subsequent steps of the method. As the curve lies on the surface, the base points also lie on the surface. The sampling may be performed automatically, or semi-automatically, or even manually. Indeed, the sampling may be performed according to a step size defining the distance between two successive points. This step size may be determined automatically by the computer according to diverse criteria such as e.g. the length of the curve and/or the number of parallel geodesic curves to be computed. The step size may be alternatively determined manually, or partially manually. Alternatively or additionally, points may be manually provided by the designer. In an example, the sampling is performed according to the local curvature radius value of the base curve. More points are created where the curvature radius is smaller. This allows an easy anticipation of cases when neighbor perpendicular geodesic curves become more and more distant from each other as they become distant from the base curve. In that case indeed, the distance between points within a level is too high and does not lead to satisfying parallel geodesic curves. To avoid unnecessary computations, the sampling does not take into account the shape of the surface that is far from the base curve and that may affect the parallel geodesic curves.

The method also comprises a step of determining S3 a grid of points of perpendicular geodesic curves. The points of the grid thus belong to perpendicular geodesic curves. Each perpendicular geodesic curve lies on the surface and departs perpendicularly from the base curve at a respective base point. As known from the prior art and earlier detailed with reference to FIG. 3, a perpendicular geodesic curve departing from the base curve at a respective base point is a geodesic curve of the surface which is perpendicular with the base curve. Generally, the parallel geodesic curves are to be computed on one side of the base curve. In this case, all the perpendicular geodesic curves may depart from the base curve toward that side. This allows computation saving. If the parallel geodesic curves are to be computed on both sides of the base curve, then the perpendicular geodesic curves may depart as well on both sides.

The perpendicular geodesic curves may be generated according to the prior art. Typically, at each base point, a normal direction, normal to the base curve, is obtained for example by solving a differential equation involving the parameterization of the base curve, or by approximating the direction of the base curve at the base curve according for example to two other points on either side of the base point. Then the perpendicular geodesic curve departing from that base point is obtained by integrating a differential equation derived from a "minimum length" or a "minimum energy" definition as explained with reference to prior art. This solution applies to all cases and is thus the easiest to implement. Perpendicular geodesic curves may also be generated by other means, for example involving known geometrical results. For instance, if the surface is spherical, as mentioned earlier with reference to prior art, geodesic curves are generated by the intersection between the surface and a plane passing by the center of the sphere. In that case, resource may be saved.

Approximations of perpendicular geodesic curves may be generated for at least a part of the base points. The design of the part does not necessarily require exact geodesic parallel curves. In that case, generating approximations of perpendicular geodesic curves allows resource saving without a significant loss of efficiency. Actual perpendicular geodesic curves are not necessarily generated, as long as the grid of points can be obtained. In particular, if approximations are used, perpendicular geodesic curves are not generated.

In the case perpendicular geodesic curves are actually generated, the generations may be parallelized because they are independent. This allows a faster computing of the parallel geodesic curves. Similarly, parallelization may be used also if the perpendicular geodesic curves are not generated.

The points of the grid each belong to a respective level. In other words, the grid comprises a plurality of levels, each level comprising a plurality of points. As geodesic perpendicular curves, by definition, lie on the surface, the points of each level lie on the surface. The number of points inside each level is not necessarily the same. However, the implementation of the method will generally lead to an identical number of points within each level. This allows systematization of the computation of the parallel geodesic curves, thus leading to homogeneous results.

Each level of the grid corresponds to a respective geodesic distance to the base curve. Typically, a designer may provide to the system in use requirements for computing the parallel geodesic curves. For example, the designer may provide the number of parallel geodesic curves he wants and/or a distance step size between each parallel geodesic curve. The step size may be variable, for example increasing with the distance from the base curve. Alternatively, the designer may provide one by one a respective distance from the base curve for each parallel geodesic curve he needs to be computed. Alternatively, at least a part of the above parameters may be determined automatically, for example if default values are used. In any case, each parallel geodesic curve is to lie at a certain geodesic distance from the base curve. Each level of the grid corresponds to a respective distance to the base curve so that it is attributed to a respective parallel geodesic curve that is to be computed. However, as will be explained later, this does not mean that the points of the grid stand at that exact geodesic distance to the base curve.

The method then comprises a step of computing S4 a plurality of parallel geodesic curves lying on the surface by using the grid of points. By the term "using", it is meant that the plurality of parallel geodesic curves is computed according to the grid of points, i.e. on the basis of the position of the points of the grid. As said above, each parallel geodesic curve corresponds to a respective level, and thus to a respective geodesic distance to the base curve. The computed parallel geodesic curves are curves different from the base curve. How the grid of points is used to compute the plurality of parallel geodesic curves will be detailed later through the different examples.

The method also comprises displaying S5 a representation of the part. The representation is preferably three-dimensional. The part may indeed be 3D modeled, and thus a 3D representation may be displayed. A 3D representation allows the viewing of the part from all angles. For example, the part may be handled and turned around any of its axes, or around any axis in the screen. This notably excludes 2D icons, which are not 3D modeled. However, a two-dimensional display may alternatively be performed.

Figure 5:
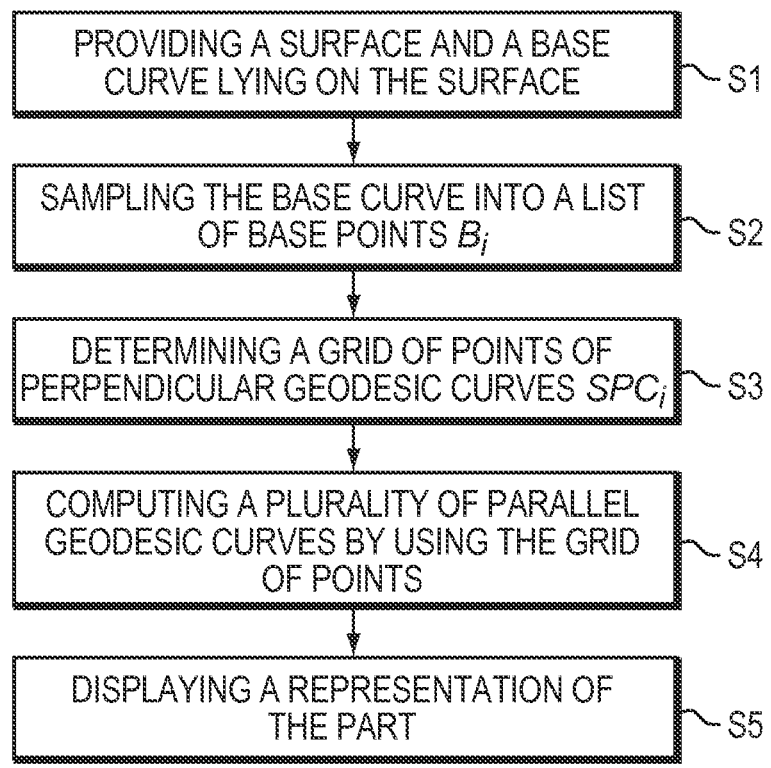
FIG. 5 shows a flowchart of the method of the invention.

On FIG. 5, this step of displaying S5 is represented subsequent to all other steps. However, it does not necessary imply that the representation of the part is displayed after the other steps of the method. Indeed, a representation of the part may be displayed while the other steps of the method are performed and updated consequently. This allows the designer to see the result of each step. Alternatively, the step of displaying may be performed upon a request from the designer.

Figure 2:
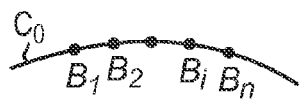
FIGS. 2-4 show a prior art method for computing a single parallel geodesic curve.
Figure 3:
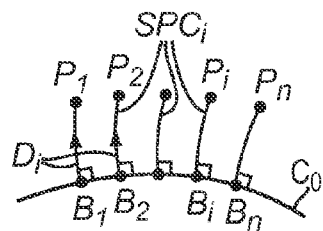
Figure 4:
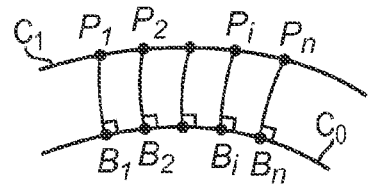

As detailed earlier with reference to FIGS. 2-4, a solution for computing a single parallel geodesic curve exists in prior art. Solutions for computing a network of geodesic curves, or an offset curve also exist. On the other hand, the method suggests the computation of a plurality of geodesic parallel curves. Thus, the method offers a new way to design parts.

In particular, computing a plurality of geodesic parallel curves proves useful when designing a composite part. A composite part is basically a surface part (e.g. airplane tail, wing, fuselage, ship hull, some automotive components) that is dressed up with a sequence of plies. Each ply is a ribbon of composite material that covers a portion of the surface part. Composite fibers of plies are deliberately oriented in such a way as to increase the directional structural stiffness and strength of the resulting part.

The art of composites design is to define the ply stacking sequence in order to obtain the stiffness and strength properties. Thus, designing this ply stacking sequence may conveniently massively use parallel geodesic curves on the base surface, which represent the projection on the base surface of the boundaries of the different stacked matter layers forming the composite part. The resulting shape is a step configuration on which all the sharp boundaries will be parallel regarding the support surface. Therefore, notably by adding the design option of computing a plurality of parallel geodesic curves and thus allowing a better design of composite parts, the method improves the art of part design.

One modification of the prior art to computing a plurality of parallel geodesic curves to the same base curve could be to repeat the process described with reference to FIGS. 2-4 as many times as necessary. Applying the prior art algorithm to compute each parallel geodesic curve one after the other presents efficiency issues detailed below. These issues are solved by the method proposed by the invention, as explained below.

A first issue is a creation and update performance issue. A classical history based CAD system would save the dependency between each base curve and all its parallel geodesic curves. Thus, when the designer changes an input parameter such as the shape of a base curve, the distance value or even the base surface, the system updates the geometry by re-computing all parallel geodesic curves individually. The computing time is not compatible with an interactive system in the case many parallel geodesic curves are computed because it may take several hours. Creation time is critical as well because several dozens of parallel geodesic curves are generated in one shot, which requires a computing time that is not compatible with an interactive system. The method of the invention solves this issue because the parallel geodesic curves are computed solely on the basis of the grid of points. The grid of points is light for the system to store, and the parallel geodesic curves may be synchronously generated using the grid of points.

A second issue solved by the invention concerns the consideration of robustness versus performance. Computing a plurality of parallel geodesic curves with the repetition of the prior art algorithm raises the question of reusing the initial base curve each time versus reusing the previous parallel curve as the base curve of the next one.

The solution that consists in computing m geodesic parallel curves from the initial base curve may be for example implemented by the algorithm of FIG. 6. The solution that consists in reusing the previous curve may be for example implemented by the algorithm of FIG. 7. Despite these two approaches are equivalent from the theoretical point of view, software implementations are not.

When reusing the initial base curve, the algorithm computes overlapping portions of geodesic perpendicular curves, as illustrated on FIGS. 8 and 9. The example of FIGS. 8 and 9 shows how two parallel geodesic curves are computed from a base curve $C_0$ with the algorithm of the kind of FIG. 6. FIG. 8 shows the first parallel geodesic curve $C_1$ while the rightmost part shows the second parallel geodesic curve $C_2$, and the first one $C_1$ in dotted line. Perpendicular geodesic curves $SPC1_i$ generated to compute the first parallel $C_1$ and perpendicular geodesic curves $SPC2_i$ generated to compute the second parallel $C_2$ are also represented.

The approach of FIG. 8 is robust but it is slow because the same computation is uselessly performed many times. Indeed, as can be seen from FIG. 8, circled portions of perpendicular geodesic curves $SPC2_i$ are portions already computed when computing the perpendicular geodesic curves $SPC1_i$. In general, the geodesic parallel curve $C_i$ number i requires n perpendicular curve segments of length id where d is the distance value separating the parallel curves. This represents an accumulated amount of length nid of perpendicular curves. Now, let m be the number of geodesic parallel curves to compute. The total computed length of perpendicular curves is $(1+2+\ldots+m)nd$, that is $$\frac{m(m+1)}{2}nd.$$

The computation of each perpendicular geodesic curve has a complexity which depends on the length of the curve being computed. Thus, using the approach of FIG. 8 raises severe speed issues.

The method of the invention solves this speed issue as the parallel geodesic curves are computed only after the grid of points is determined. Indeed, perpendicular geodesic curves may be generated only once at maximum, in order to determine S3 the grid of points in one sole step. A typical composites design involves one to two thousands curves, corresponding to the number of fibers represented. These curves are arranged by bundles of ten to fifty parallel geodesic curves. As can be seen from the above, a core geometrical feature of composites design and manufacturing preparation is the computation of parallel geodesic curves. There may indeed be a need to compute parallel geodesic curves as many as several dozens of bundles, each including dozens of parallel geodesic curves to the base curve, yielding one to two thousands resulting curves. Thus, the efficiency of the computing of a plurality of parallel geodesic curves is particularly useful when composite parts are designed.

Figure 10:
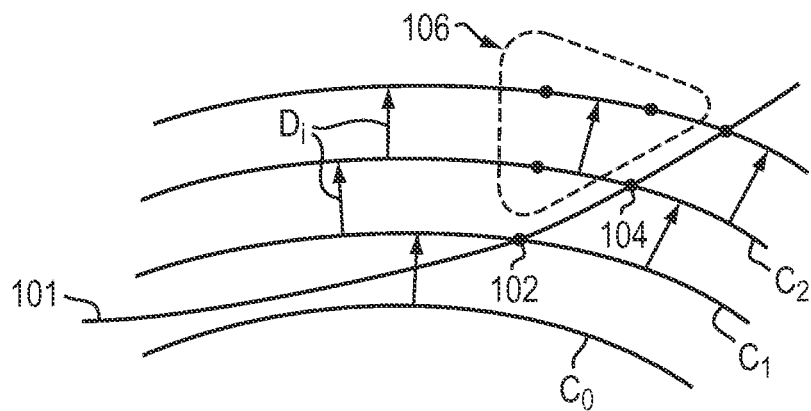

Reusing the previous parallel curve as the base curve also avoids this phenomenon because only new portions of perpendicular curves are computed. Unfortunately, it amplifies imperfections of the previous curve such as unwanted oscillations or sharp points. Such a method is thus faster than the method illustrated by FIGS. 6, 8 and 9 but the quality is not sure. Another drawback of reusing the previous curve, illustrated on FIG. 10, is the artificial proliferation of vertices when crossing an internal boundary curve 101 of the surface. The base curve $C_0$ does not cross the internal boundary curve 101. The first parallel curve $C_1$ crosses the boundary curve 101, so a vertex 102 is created, splitting the first parallel curve $C_1$ into two consecutive arcs. To compute the second parallel curve $C_2$, it is thus necessary to separately compute a parallel leftmost arc from the leftmost arc of the first parallel curve $C_1$ and a parallel rightmost arc from the rightmost arc of the first parallel curve $C_1$. The parallel leftmost arc does not cross the boundary curve 101. The parallel rightmost arc crosses the boundary curve 101, so a second vertex 104 is created, yielding a second parallel curve $C_2$ including three consecutive arcs. The second parallel rightmost arc crosses again the internal boundary curve, and so on. Such a method thus creates a number of superfluous vertices 106, circled in dotted line on FIG. 10.

Figure 11:
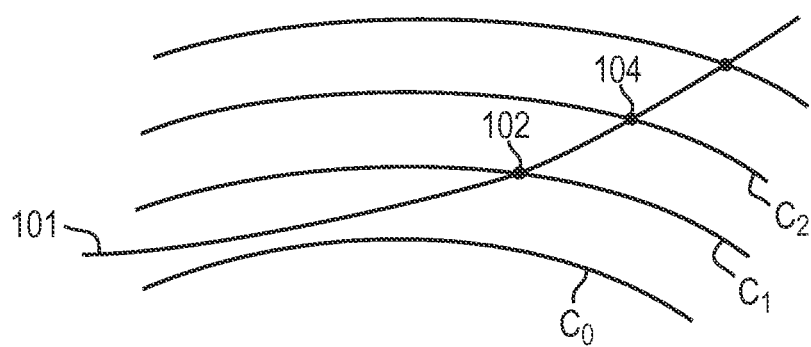

FIG. 11 illustrates the correct result, featuring the minimum number of vertices, which does not comprise the superfluous vertices of FIG. 10. In general, noting k the number of parallel curves crossing the internal boundary curve, the total number of superfluous vertices created by the approach of FIG. 10 is $$\frac{k(k-1)}{2}.$$

Compared to the minimum number k of vertices, this means o(k²) superfluous vertices created. As it does not compute parallel curves one from the other the method of the invention avoids the proliferation and amplification of imperfections, as well as the creation of superfluous vertices.

Thus, the method of the invention provides an efficient way of computing a plurality of parallel geodesic curves from a base curve, from a resource and computation complexity point of view. Thanks to that, the method allows an efficient design, notably of composite parts. On this basis, the part designed with the method may be a composite part and thereby highlight the advantages of using the method.

The method may be performed on a CAD system with interaction with a user using a graphical user interface. In reference to FIG. 12, the exemplified graphical user interface (or GUI) 100 may be a typical CAD-like interface, having standard menu bars 110, 120, as well as bottom and side toolbars 140, 150. Such menu- and toolbars contain a set of user-selectable icons, each icon being associated with one or more operations or functions, as known in the art.

Some of these icons are associated with software tools, adapted for editing and/or working on a modeled product 200 or parts of product 200 such as that displayed in the GUI 100. The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of a 3D modeled object displayed on the screen.

Figure 12:
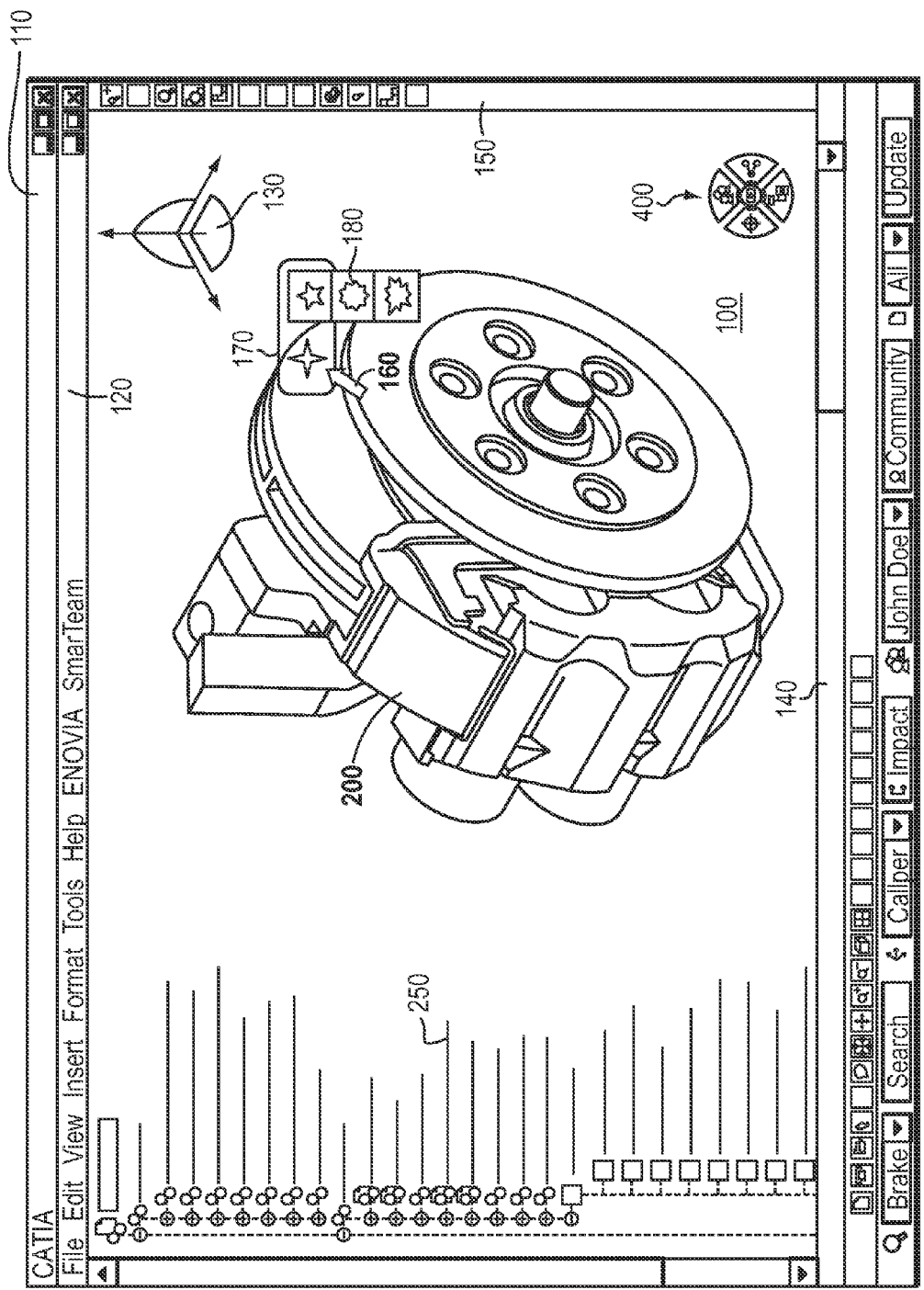
FIG. 12 shows an example of a GUI suited for performing the method.

The GUI may for example display data 250 related to the displayed product 200. In the example of FIG. 12, the data 250, displayed as a "feature tree", and their 3D representation 200 pertain to a brake assembly including brake caliper and disc. The GUI may further show various types of graphic tool 130, 160, 170, 180, 400, for example for facilitating 3D orientation of the object, for triggering a simulation of an operation of an edited product or render various attributes of the displayed product 200.

The computing S4 of the plurality of parallel geodesic curves may comprise interpolating the points of each level. Interpolating the points within a level means computing a curve which passes through all the points of the level. This may be achieved using any interpolation algorithm known from prior art, such as polynomial interpolation. The interpolation may be constrained by the surface so that the curve obtained lies on the surface. Such constraints allow obtaining a very precise result. Alternatively, the interpolation may be unconstrained by the surface and the result may be projected on the surface, the projection thereby defining the geodesic parallel curve corresponding to the level.

An example of computing the plurality of parallel geodesic curve with the method is discussed briefly. In this example, the points of a level may be for example interpolated by a polygonal line, which will also be referred to as poly-line hereafter, i.e. a sequence of straight segments linking pairs of points of the level. For example, the points obtained after the sampling of the base curve may present an order. This order may be retrieved within the levels. From each poly-line so formed, a corresponding parallel geodesic curve may be computed. For example the poly-line may be projected on the surface. The result of the projection may then be smoothed so as to obtain a required continuity. Inversely, the poly-line may be smoothed and then projected on the surface. Also, the poly-line may be not projected on the surface. The projection on the surface is not essential. Its importance depends on how the design of the part obtained by the method is to be used (i.e. what the designer wants). Thus, the computed parallel geodesic curves may be the poly-lines themselves or the poly-lines after smoothing. In that case, they do not lie exactly on the surface. This considerably speeds up performance of the method. In general, using the smoothing process on a poly-line or on the projection of a poly-line to compute a parallel geodesic curve is relatively fast while leading to an acceptable result from an industrial design point of view.

Alternatively, the computing S4 may comprise fitting the points of each level. Fitting points is approximating the points with a curve which does not necessarily pass through the points. This is typically an optimization problem, for example testing a set of parameters for different families of curves and minimizing a least square sum. Such fitting methods are known from prior art. Using a fitting method allows resource saving. Indeed, as the geodesic parallel curve is not required to pass through all points of a level, good results may be achieved with simple curve families. As a consequence, few parameters are required to compute the geodesic parallel curves.

Of course, a combination of interpolating and fitting may be used among the levels, and/or also among the point within levels. For example, less precision may be required for distant parallel geodesic curves. They may be obtained by fitting points of their corresponding level while closer parallel geodesic curves are obtained by interpolation. Such a combination increases the design possibilities offered to the designer as it covers more design intents.

The prior art algorithm, described with reference to FIG. 2-4, is designed to compute a single parallel geodesic curve within the context of a general purpose geometric modeling system. Consequently, the geometric modeling program provides a result that is as precise as possible because the resulting curve is potentially reused in further design. In the context of general purpose modeling, precision is preferred to performance. Also, the very last step of the prior art algorithm is to provide a smooth curve by interpolating points $P_i$ by a polynomial or rational curve (typically B-spline or NURBS curve). Once more, in the context of a general purpose geometric modeling system, this interpolation is precision oriented. Consequently, the computed curve may need many (polynomial or rational) arcs, which requires huge data memory to store and manage thousands of parallel geodesic curves.

The resource saving solutions provided by the method and described earlier are thus a departure from the prior art. Indeed, the prior art algorithm does not apply efficiently for computing a plurality of parallel geodesic curves as the computational effort is multiplied by the number of parallel curves to be created. The method of the invention proposes resource saving that allow a fast and easily updatable computation of a high number of parallel curves. Precision is decreased. However, a precision as high as the precision of the prior art when computing a single parallel curve is not required when there is a high number of parallel curves. For example, when designing a composite part, there is no need that all the fibers are perfect parallel geodesic curves of a base. Indeed, the industrial process will lead to imprecision anyway.

The method may further comprise modifying one or more levels. Modifying a level allows to correct singularities. Furthermore, as points are easy to manipulate in terms of computational effort, the correction of singularities is performed very efficiently. An issue solved by the method is thus a singularity management performance issue.

Figures 13, 14:
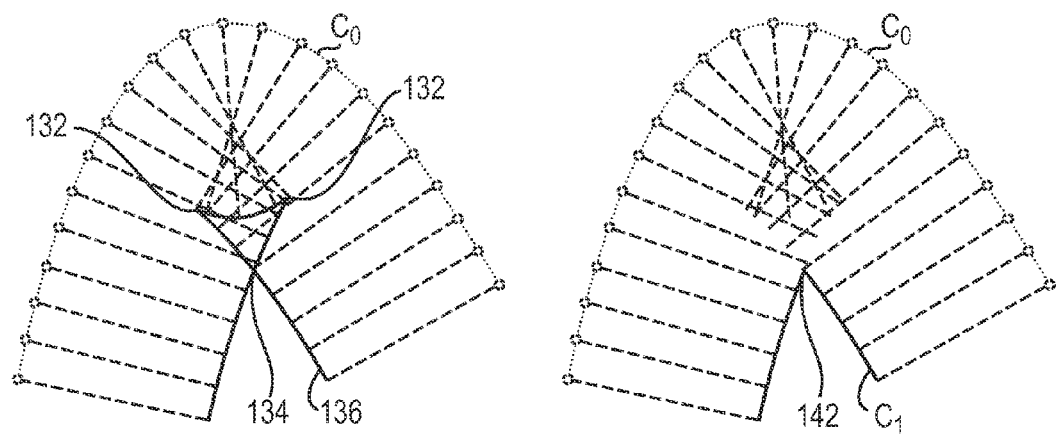

Singularities are undesirable features of the parallel curves. The issue of one type of singularities is now discussed with reference to the example of FIGS. 13-14. The classical singularity in the field of parallel geodesic curve computing is the curvature radius of the parallel curve that is locally smaller than the distance value. The example of FIG. 13 shows how a direct application of the prior art algorithm of FIGS. 2-4 leads to such a singularity. The prior art algorithm is used to compute from the base curve $C_0$ the geodesic parallel curve 136. The theoretical solution 136 features in this example two "cusp" points 132 and one self intersection point 134 on the parallel curve 136. This is unusable for industrial purpose. Thus a singularity management is unavoidable. How singularities are managed determines the usability of the method for computing parallel curves. Indeed, in the context of composites, about 80% of robustness problems result from singularity management failure.

A straightforward solution applied in prior art consists in removing the loop resulting from the self intersection. The result is shown on FIG. 14. A first problem of this solution is that a sharp vertex 142 is created on the corrected parallel curve $C_1$. A second problem is linked to the fact that when computing families of parallel curves, families of singularities may occur. Individual management of these singularities leads to performance issue as well. Indeed, as explained above, in the context of general purpose modeling, precision is preferred to performance. This holds as well for singularity management: the self intersection point resulting from high curvature is precisely computed through curves intersection.

On the contrary, the method manages singularities by modifying one or more levels of the grid, and thus may only manipulate points. As points are easy to handle, this solves performance issues. In the case a poly-line is formed for a level, the level may be modified by manipulating the segments of the poly-line. This is also very light in terms of computational effort. Singularities may in any case be managed on the levels without manipulation of the final parallel curves, which manipulation requires high resources. Furthermore, modifying a level avoids the risk that undesired features appear on the final parallel curves as they are manipulated, e.g. undesired sharp vertices such as sharp vertex 142 of FIG. 14 when a loop of a curve is truncated.

It is also noted that Kellermann et al. patent application provides a solution for singularity management. This solution requires smoothing the base curve each time a singularity is expected on the resulting offset curve. By itself, this smoothing involves a sampling and an algorithm to provide a polynomial or rational curve. This strategy is not compatible with performance issues in the context of composites because the resulting parallel curve needs to be smoothed in order to avoid singularity on the next parallel curve. Furthermore, this process of alternate curve smoothing and parallel curve computing corrupts the precision all the way long by cumulating smoothing errors. Finally, Kellermann et al. solution is designed to overcome relatively tiny oscillations on a relatively flat input curve. Issues for handling a U-shape or L-shape input curve are not addressed.

Modifying one or more levels may be performed prior to the step of computing S4 the plurality of parallel geodesic curves, or concomitant to it as will be detailed later. It may be also performed after. In that case, a step of re-computing a plurality of corrected parallel geodesic curves may follow. This provides the designer with the possibility to observe the singularities before deciding to correct them or not.

Suppose that we are in the case that the step of computing the plurality of parallel geodesic curves comprises interpolating the points of each level with a polygonal line, the polygonal line comprising segments formed over a sequence of points of the level. The step of modifying one or more levels may then comprise discarding at least one segment of the level under modification.

If we go back to FIG. 13, this could for example be achieved by discarding all the segments corresponding to the loop. After smoothing, such a solution would lead to a result similar to the result of FIG. 14. However, because the polyline is to be smoothed only after the segments are discarded according to the method, the correction of the singularity is faster and does not lead to the undesired sharp vertex 142.

In the case another interpolation algorithm is used (different from poly-line interpolation), the principle of discarding arcs linking two points of the grid remains the same. In the case a fitting algorithm is used and in general, points of the grid may be discarded, in order to correct singularities.

Alternatively or additionally to discarding segments or points, the modifying of one or more levels may comprise modifying the positions of segments or points of the level under modification. It may also comprise inserting new segments or new points within the level.

Figure 15:
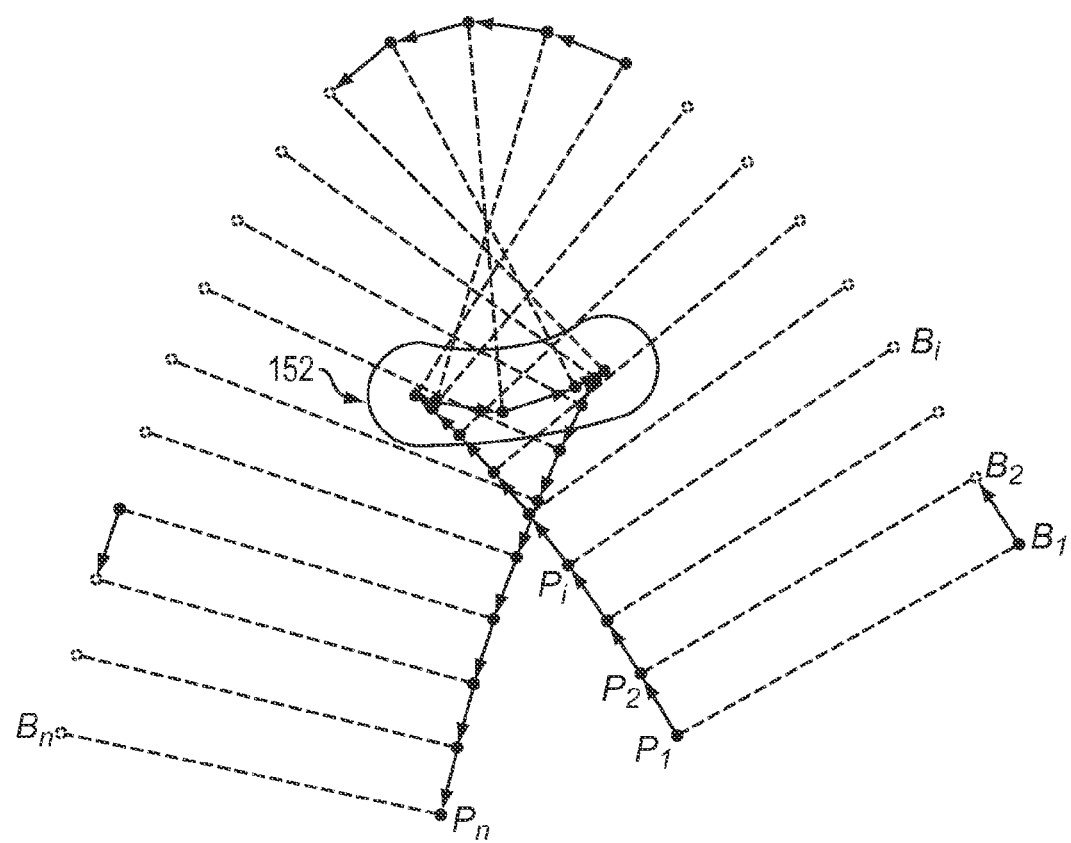

An example of a way to discard segments is described with reference to FIG. 15. In FIG. 15, the base curve $C_0$ and one level comprising points $(P_1, \ldots, P_n)$ are represented. The modifying of one or more levels may comprise forming vectors $\overrightarrow{P_iP_{i+1}}$ corresponding to segments $[P_i,P_{i+1}]$ of the level under modification. These vectors are represented by arrows on FIG. 15. Each vector has a start point $P_i$ and an end point $P_{i+1}$. The formed vector has a corresponding base vector $\overrightarrow{B_iB_{i+1}}$, formed by two points, $B_i$ and $B_{i+1}$, of the base curve $C_0$ corresponding to the start point $P_i$ and the end point $P_{i+1}$ respectively. The modifying of one or more levels may also comprise evaluating if the formed vectors $\overrightarrow{P_iP_{i+1}}$ are oriented in a same direction as the corresponding base vectors $\overrightarrow{B_iB_{i+1}}$. It may also comprise, upon the result of the step of evaluating, determining regular segments and irregular segments 152 of the sequence. An irregular segment 152 is a segment which corresponds to a vector evaluated to be oriented in a different direction from the corresponding base vector. The irregular segments may then be discarded from the level under modification.

In an example, which may be applied to the general case, the grid of points determined at step S3 includes the point wise description of the base curve $C_0$, the point wise definition of all parallel geodesic curves $(C_1, \ldots)$, and a coupling between each point $B_i$ of the base curve and its corresponding point ($P_i$ for the level represented on FIG. 15) on each geodesic parallel curve. Each point wise parallel geodesic curve is seen as a poly-line. The singularity management is performed for each poly-line.

As explained, the first step is to identify singular line segments. By definition, a line segment $[P_i,P_{i+1}]$ corresponding to vector $\overrightarrow{P_iP_{i+1}}$ is regular if the vector has the same orientation as its corresponding base vector $\overrightarrow{B_iB_{i+1}}$. It is singular otherwise. The scalar product may be used to perform this evaluation. In other words, the segment $[P_i,P_{i+1}]$ is regular if $\langle \overrightarrow{P_iP_{i+1}} | \overrightarrow{B_iB_{i+1}} \rangle > 0$, it is singular if $\langle \overrightarrow{P_iP_{i+1}} | \overrightarrow{B_iB_{i+1}} \rangle \leq 0$, where the notation $\langle U|V \rangle$ is the scalar product of vectors U and V. Other ways of evaluating if the two vectors have the same direction may be used, such as computing their angle. Other criteria of defining a singular segment may also be used. For example, if a scalar product is too small, even though not negative, then the angle between the two vectors is almost 90°, the corresponding segment could be considered singular and thus discarded. Also, a point $P_i$ is regular if the line segments $[P_i,P_{i+1}]$ and $[P_{i-1},P_i]$ are regular. A point $P_i$ is singular if at least one line segment $[P_iP_{i+1}]$ and $[P_{i-1},P_i]$ is singular. The modifying of one or more levels may comprise discarding all singular points, or, discarding all points $P_i$ if both line segments $[P_i,P_{i+1}]$ and $[P_{i-1},P_i]$ are singular.

The above examples show how the grid of points allows fast correction of singularities. Indeed, the computations only involve the positions of the points of the level. Differential computations involving parameterizations of curves are not required.

After segments corresponding to vectors not oriented have been discarded, the polygonal line presents holes. Then, by definition, the polygonal comprises polygonal branches. A polygonal branch is a sequence of regular segments of the level under modification. The segments within a polygonal branch are linked. Polygonal branches are separated by a sequence of previously discarded segments of the level.

Figure 16:
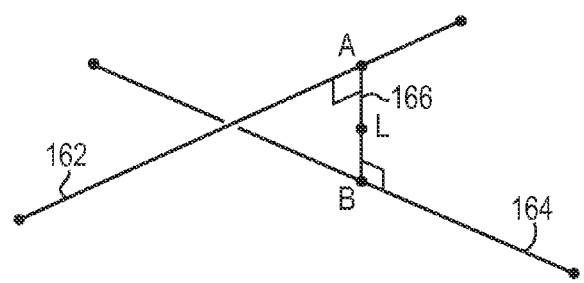

The modifying of one or more levels may further comprise determining an intersection between a first polygonal branch and a second polygonal branch. The intersection is the shortest line, for example in the Euclidean meaning, linking the first polygonal branch and the second polygonal branch. All the segments of the first polygonal branch after the intersection and all the segments of the second polygonal branch before the intersection may then be discarded. By "before" and "after" the intersection, it is referred to the order within a level, corresponding to the order of the base points. With reference to FIG. 16 the shortest line linking 166 the first polygonal branch 162 to the second polygonal branch 164 determines at an extremity a points A of the first branch 162 and at its other extremity a point B of the second branch 164. Note that points A and B are not in the general case points of the level with the above definition of the intersection. However, for higher speed, the intersection may on the contrary be computed as the shortest line linking a point of the level on the first branch and a point of the level on the second branch. All the segments "after" point A means all the segments formed by points of the first polygonal branch positioned after point A on the branch. It possibly comprises the segment on which point A lies. Similarly, all the segments "before" point B means all the segments formed by points of the second polygonal branch positioned before point B on the branch. It possibly comprises the segment on which point B lies. Discarding these other segments makes the subsequent smoothing of the polygonal line easier. The first branch and the second branch are thus reduced.

The modifying may further comprise adding to the level under modification a leader point located on the intersection. The leader point is preferably located on the middle of the intersection. This is exemplified by FIGS. 15-18 which each show a different step of the modification of one or more levels comprising all the options listed above.

On FIG. 15, the local singular/regular status of line segments is known. Then, singular line segments are discarded, leaving a two branches poly-line including only regular line segments in first branch 162 and second branch 164 as represented on FIG. 17. These two branches are trimmed by computing the so called "leader point" L according, for example, to the following method. First, find the couple of points A and B (one point on each branch) realizing the shortest distance between the two branches. By definition, the line segment joining these two points is perpendicular to each branch of the poly-line. Then, the leader point L may be the middle point of this line segment, as illustrated on FIG. 16, i.e.

$$L := \frac{A+B}{2}.$$

Of course, other methods may be implemented. It should be understood that the leader point computation is performed in the 3D space, as opposed to a 2D plane. This is because the poly-lines are defined on a non planar surface and, consequently, are non planar objects.

Figures 17, 18:
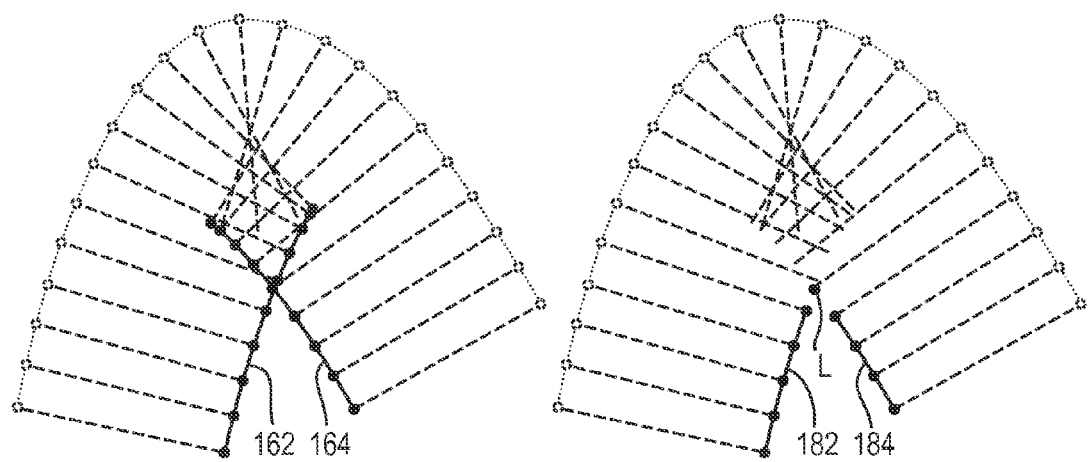

After the intersection is determined, as explained earlier, the line segments of the branches 162 and 164 beyond the leader point L are discarded. FIG. 18 illustrates the final branches, i.e. first trimmed branch 182 and second trimmed branch 184, together with the leader point L. Notice that, as mentioned earlier, the singularity management yields discontinuous poly-lines consisting of branches.

Figures 19, 20, 21:
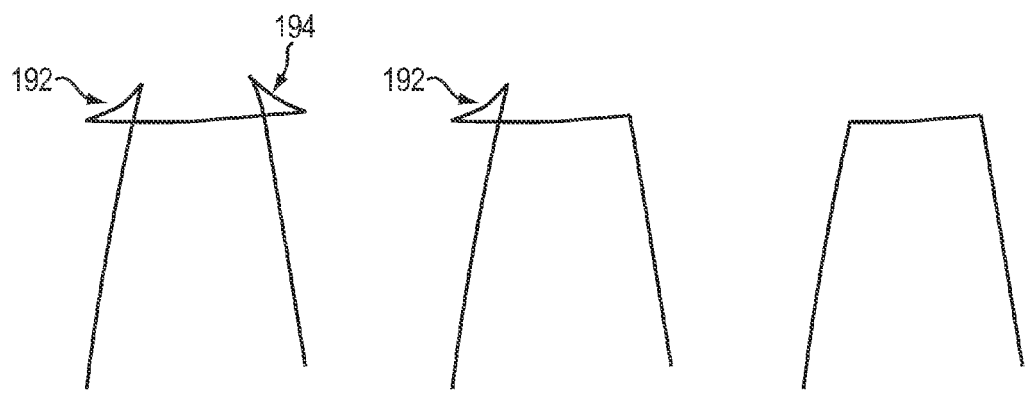

This algorithm is able to solve a sequence of singularities occurring on a geodesic parallel curve, as illustrated on FIGS. 19-21. The curve on FIG. 19 features two separated singularities 192 and 194. The curve on FIG. 20 is the result after the rightmost singularity 194 is solved. The curve on FIG. 21 is the result after the leftmost singularity 192 is solved.

Whether the singularities overlap or not is not a problem from the algorithm point of view. This is shown with the example of FIGS. 22-24. The curve of FIG. 22 features two overlapping singularities 222 and 224. The curve of FIG. 23 is the result after the first singularity 224 is solved, and the curve of FIG. 24 is the final result.

FIG. 25 illustrates a typical situation of singularity propagation. The upper curve $C_0$ is the base curve. The examples of FIGS. 19-21 and 22-24 are respectively the third 253 and fifth 255 curves. All these singularities can be solved by the previous options of the method.

The modifying of one or more levels may further comprise forming vectors corresponding to segments of at least one other level, the formed vectors of the other level having corresponding base vectors. In other words, what has been performed for one level is now performed for another level. Then, it is evaluated if the formed vectors of the other level are oriented in a same direction as the corresponding base vectors. Upon the result of the step of evaluating for the other level, regular segments from the level under modification may be discarded. The idea here is to use the result of the evaluation for the other level to detect singularities not detected yet. This leads to a higher robustness of the singularity cleaning.

As explained previously, a "simple" singularity is solved by discarding singular segments and by trimming the remaining polygonal branches. On the opposite, a "complex" singularity is characterized by the fact that, sometimes, some regular segments have to be discarded despite their being regular. The solution to correct complex singularities takes benefit of the propagation information.

Indeed, as illustrated earlier with reference to FIG. 25, singularity is a propagating phenomenon from a geodesic parallel curve to the next one. A singularity may appear and disappear, but it generally involves several consecutive geodesic parallel curves. Complex singularities are tricky bunches of crossing line segments mixing regular and singular types and very sensitive to offset distance value. The propagation phenomenon is exploited by the invention to reuse information about the singularity from a geodesic parallel curve to the next one. The goal is to identify regular line segments that are "suspicious", meaning that they might be discarded. This information is used by the algorithm that computes poly-lines branch intersection and trimming. Situations can occur where discarding suspicious line segments leads to a solution, while keeping these line segments would not provide any solution at all.

The issue is to quantify the meaning of "suspicious". The tables below illustrate an example of an algorithm performed on four geodesic parallel curves including ten line segments each. Each row captures line segments status of a parallel geodesic curve that may be evaluated as described earlier. Initially, a line segment status is either regular (value 1 in the table) or singular (value 0 in the table). For example, the status of line segment number eight of curve number two is 1 (regular). This provides the following table:

|   | 1 | 2 | 3 | 4 | 5 | 6 | 7 | 8 | 9 | 10 |
|---|---|---|---|---|---|---|---|---|---|----|
| 1 | 1 | 1 | 0 | 1 | 1 | 1 | 1 | 0 | 1 | 1  |
| 2 | 1 | 0 | 1 | 0 | 1 | 1 | 0 | 1 | 0 | 1  |
| 3 | 1 | 1 | 0 | 1 | 1 | 1 | 1 | 1 | 0 | 1  |
| 4 | 1 | 1 | 0 | 0 | 1 | 1 | 0 | 0 | 1 | 1  |

In this example, the first step is to change all value 1 columns to value 2 columns (see columns 1, 5, 6 and 10 in the table below). Value 2 captures a regular status that will not be changed: a line segment with constant regular status is genuinely regular (not suspicious). This provides the following table:

|   | 1 | 2 | 3 | 4 | 5 | 6 | 7 | 8 | 9 | 10 |
|---|---|---|---|---|---|---|---|---|---|----|
| 1 | 2 | 1 | 0 | 1 | 2 | 2 | 1 | 0 | 1 | 2  |
| 2 | 2 | 0 | 1 | 0 | 2 | 2 | 0 | 1 | 0 | 2  |
| 3 | 2 | 1 | 0 | 1 | 2 | 2 | 1 | 1 | 0 | 2  |
| 4 | 2 | 1 | 0 | 0 | 2 | 2 | 0 | 0 | 1 | 2  |

The next step is to horizontally propagate values 2 to neighboring values 1. In other words, if value 1 is close to value 2, then it is switched to value 2. This is repeated iteratively until nothing can be changed. The next table illustrates the horizontal propagation result. The idea is that regular segments neighboring genuinely regular segments are themselves not suspicious. This provides the following table:

|   | 1 | 2 | 3 | 4 | 5 | 6 | 7 | 8 | 9 | 10 |
|---|---|---|---|---|---|---|---|---|---|----|
| 1 | 2 | 2 | 0 | 2 | 2 | 2 | 2 | 0 | 2 | 2  |
| 2 | 2 | 0 | 1 | 0 | 2 | 2 | 0 | 1 | 0 | 2  |
| 3 | 2 | 2 | 0 | 2 | 2 | 2 | 2 | 2 | 0 | 2  |
| 4 | 2 | 2 | 0 | 0 | 2 | 2 | 0 | 0 | 2 | 2  |

Now, the remaining values 1 are horizontally surrounded by values 0. By definition, they are suspicious, meaning that corresponding line segments might have to be discarded despite they are regular. In the previous table, only line segments number three and eight of curve number two are suspicious.

Of course, the above scheme is only an example. Other schemes may be performed to define suspicious segments. For instance, instead of changing all value 1 columns to value 2 columns, a more localized processing may be applied. For example, if the i-th segment is regular for at least five successive curves from n−2 to n+2, then the value of the i-th column and n-th row may be changed to 2. As long as the evaluation of the singular/regular status of segments of another level are used for evaluating the suspicious status of segment of a level under modification, the cleaning of singularities is enhanced. Thanks to the grid of points determined, a better cleaning can be performed by the method. This example shows the capabilities offered by the use of a grid of points as opposed to prior art techniques.

Once segments have been evaluated as suspicious, they may be discarded. Alternatively and as exemplified below, further evaluations may be performed.

Regular and suspicious poly-lines are ordered in a list according to the orientation. The suspicious status is used as follows: when there is no intersection between a regular polygonal branch (i.e. a branch consisting of regular segments) and a suspicious polygonal branch (i.e. a branch consisting of suspicious segments), the suspicious poly-line may be discarded, and the regular poly-line is intersected with the next poly-line in the sequence according to the intersection scheme described earlier with reference to FIG. 16.

Figure 26:
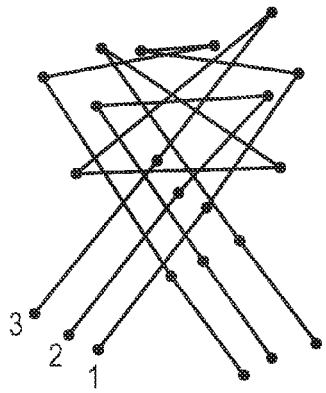
FIGS. 26-31 show examples of the method with suspicious segments.
Figure 27:
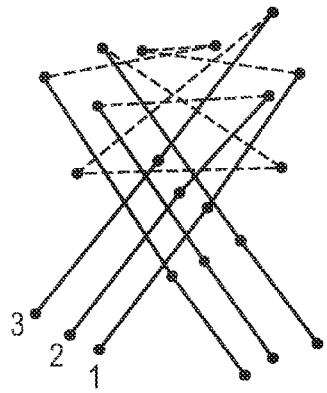
Figure 28:
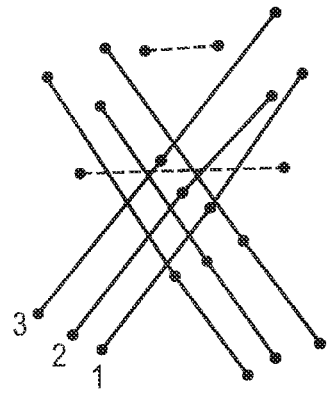

FIGS. 26-31 present an example of the performing of such a scheme. FIG. 26 illustrate a sequence of three consecutive geodesic parallel curves featuring complex singularities. The result of status computation is illustrated on FIG. 27. Short dotted lines are singular, full lines are regular, and long dotted lines are suspicious. Discarding singular poly-lines yields the geometry of FIG. 28.

Figure 29:
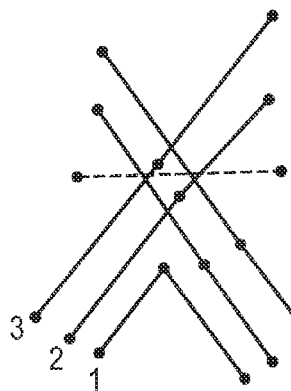
Figure 30:
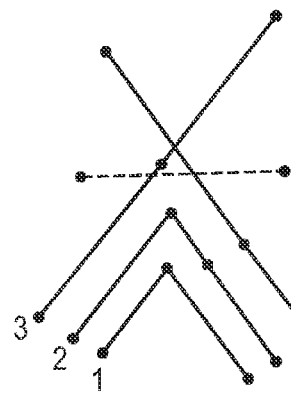
Figure 31:
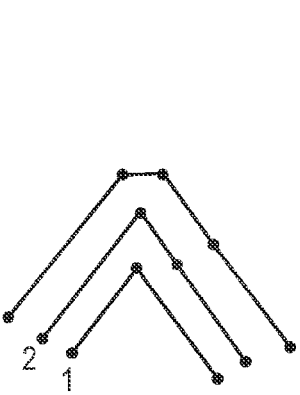

Solving sequentially curves number one, two and three is illustrated on FIGS. 29-31. Notice that the suspicious poly-line of curve one is discarded (FIG. 29), while suspicious poly-line of curve three is involved in the result (horizontal line in FIGS. 30 and 31).

In the case segments, singular or suspicious, have been discarded according to any or a combination of the examples provided above, to each parallel geodesic curve to be computed, there corresponds a poly-line formed by successive polygonal branches and possibly leader points between the branches. This poly-line may then be smoothed in order to provide a result as discussed earlier.

In an example, each branch is smoothed. The smoothing algorithm may be relaxed according to a tolerance that is defined thanks to the composites context. Given this tolerance, the smoothing algorithm does not need to be as precise as the usual interpolation algorithm. Only the end points of the poly-line branches need to be exact. Consequently, the smoothing step is faster and yields light resulting (B-spline or NURBS) curves.

Figure 32:
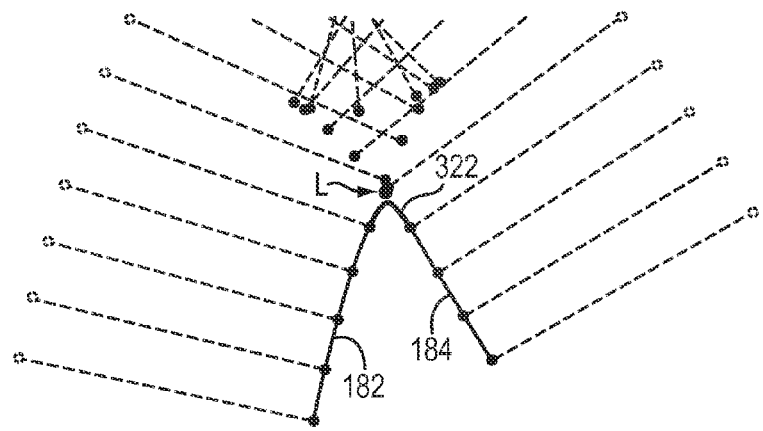
FIGS. 32-33 show an example of connecting branches.
Figure 33:
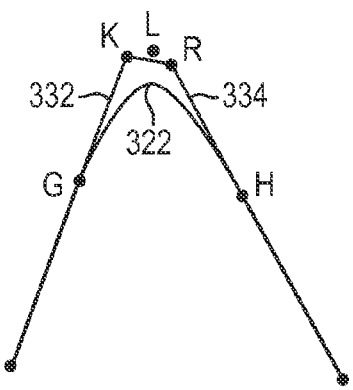

In the example of FIG. 32, the smoothed branches 182 and 184 are connected. The portion of curve connecting the smoothed branches 322 in the neighborhood of a leader point L is possibly not computed by the smoothing algorithm: a connecting curve 322 is computed on purpose. A typical solution, illustrated on FIG. 33, is a degree three polynomial Bezier arc 322 defined as follows. End points G and H of the control polygon are the end points of the branches to connect. The two remaining control points K and R are respectively collinear to the branches tangent directions 332 and 334.

They are adjusted in such a way that the middle point of the polynomial Bezier arc 322 is close enough to the leader point L according to the composites tolerance. Notice that the connecting curve 322 does not go through the leader point, and that it does not feature any sharp vertex, as opposed to the prior art solution. This example provides an accurate result.

In another example, all the branches are connected by straight lines, possibly to the leader points if any, so as to form a continuous poly-line. The poly-line is then smoothed in one shot. This provides a fast result.

The above schemes are performed for correcting singularities which appear notably in the case the base curve is U-shaped or present U-shape areas. Issues may also appear when the base curve comprises a sharp vertex.

Figure 34:
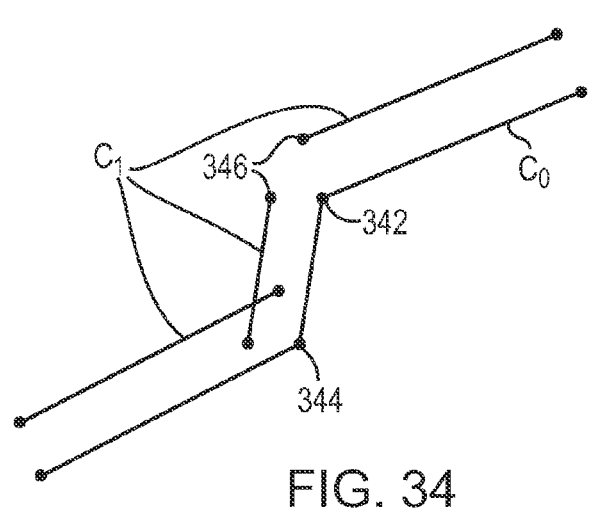
FIGS. 34-36 show an example of a base curve having sharp vertices.

This is exemplified at FIG. 34 which depicts one level corresponding to a parallel geodesic curve with a base curve $C_0$ having sharp vertices 342 and 344. In the context of composites, the input base curve $C_0$ often features sharp vertices (342, 344). The theoretical solution is a discontinuous and possibly self intersecting parallel curve $C_1$. Prior art CAD systems provide options to connect the discontinuous parallel curve by arcs or geodesic circles or trimmed geodesic extrapolations. Both solutions, governed by the intrinsic precision required for a general purpose geometric modeling system, are computer time consuming. Thus, when the base curve includes sharp vertices, a dedicated treatment which is less time consuming is needed.

Figure 35:
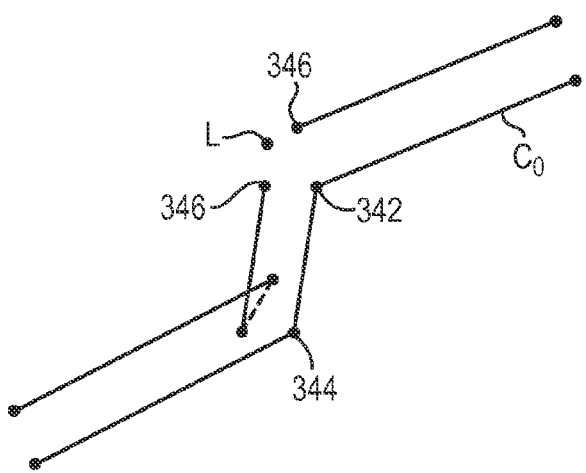

For example, the modifying may comprise adding at least one point, preferably a leader point L as depicted on FIG. 35, to the level under modification, according to the position of two points 346 of the level corresponding to two base points, not represented, of the base curve $C_0$ on either side of the sharp vertex 342. The leader point L is computed to correct the discontinuity problem raised by sharp vertex 342. The leader point L may be computed as described above with reference to FIG. 16. To this end, the extremity segments of the branches of the poly-line between which the leader point L is to be computed may be extended so that an intersection may be computed. Alternatively, the leader point may be computed according to the position of points 346 of the level which define the extremity of each branch. The self-intersecting problem raised by sharp vertex 344 may be corrected by the singularity correction method presented with reference to FIGS. 15-18.

Figure 36:
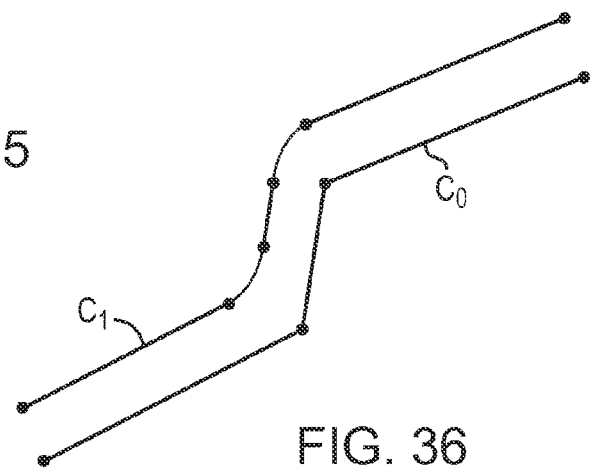

Thus, the sharp vertex problems are transformed into singularity problems, the solutions of which are previously described. It may include adding artificial singular segments on the convex side of the poly-line and by adding a leader point between branches of a concave side, as illustrated on FIG. 35. This way, the discontinuous parallel geodesic curve is not an issue; it is handled by the existing singularity management algorithm. FIG. 36 illustrates the shape of the parallel curve $C_1$ resulting from the geometry illustrated in the FIG. 35, after connecting the branches and smoothing.

It may also be provided to the user an option so that at least one parallel geodesic curve comprises a sharp vertex. This increases the coverage of different design intents.

So far, the invention provides smooth resulting curves in any circumstances. However, it may happen that the design intent is better captured through a sharp vertex in the resulting curve. In this case, for example, the system may use the leader point as the resulting sharp vertex to connect regular branches. The criterion applied by the system to decide when to create a sharp vertex is based on the (small) magnitude of the curvature radius if the polynomial curve was created. Industrial tests will provide an appropriate threshold value. Another advantage of this option is data saving because modeling a sharp vertex requires less data memory than a polynomial (or rational) curve featuring a small radius. Then, the method result may be characterized by parallel geodesic curves that never feature a small curvature radius. Either a resulting curve is smooth and the curvature radius is nowhere too small, or potentially small curvature radiuses are replaced by sharp vertices.

The grid of points may be dynamically refined. This allows optimizing the distance between different points of the grid.

The base curve is classically sampled according to step length and curvature. There is no reason for this sampling to remain consistent all along the perpendicular geodesic curves. It depends on the transverse flow of perpendicular geodesic curves. In order to save sampling density, the dynamic sampling algorithm inserts additional perpendicular geodesic curves between two consecutives perpendicular geodesic curves that deviate from each other, and uses these added curves to refine the grid. This is illustrated with an example with reference to FIGS. 37-43.

Figure 37:
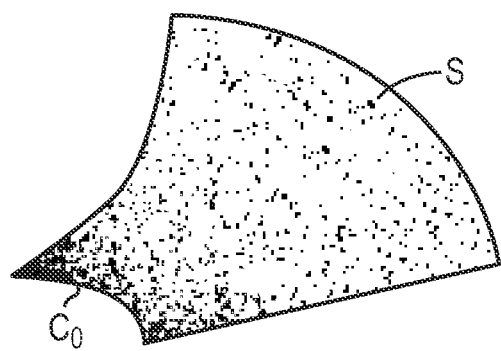
FIGS. 37-43 show an example of dynamically refining the grid.
Figure 38:
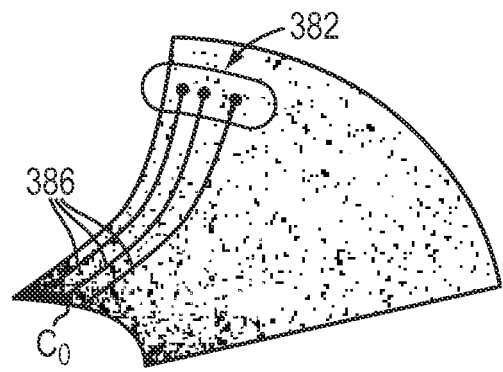

In this example the surface S and the base curve $C_0$ are as in FIG. 37. After generation of perpendicular geodesic curves, as depicted on FIG. 38, the first three perpendicular geodesic curves 386 save the distance separating the initial base points, thus maintaining sampling density. In other words, the step size between the base points is retrieved between the points 382 at the end of the perpendicular geodesic curves, circled on FIG. 38, which may for example correspond to the highest level of the grid. Of course, by "save the distance" or "the step size is retrieved", it is meant that this step size is not increased beyond a predetermined threshold, and not necessarily that it remains exactly the same. Notably, it may decrease, as a decrease in step size does not harm precision.

Figure 39:
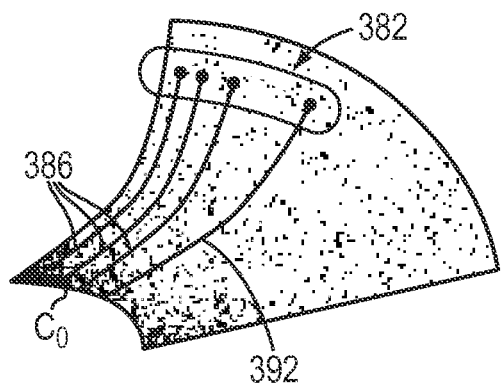

In this example, a fourth perpendicular geodesic curve 392 which is also generated deviates from the previous ones 386 because of the surface S shape, as illustrated on FIG. 39.

Figure 40:
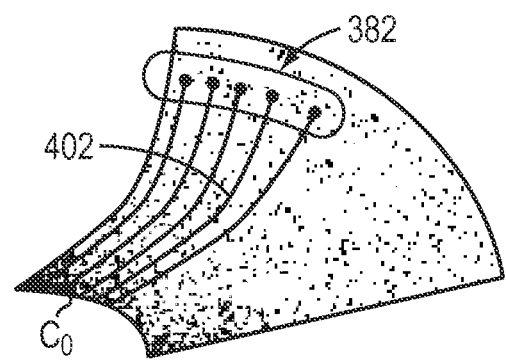

Since this deviation is larger than the threshold (defined later), the algorithm may insert an additional perpendicular geodesic curve 402 before the last one 392, which restores the sampling density at the other end of perpendicular geodesic curves, as illustrated on FIG. 40. Notice that between the points 382 at the end of perpendicular geodesic curves, circled on FIG. 40, the sampling density has been restored.

Figure 41:
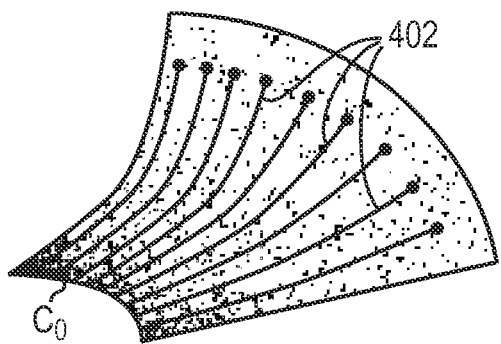

The resulting set of perpendicular geodesic curves is illustrated on FIG. 41. Nine curves are created, including three inserted curves 402 in order to maintain sampling density.

Figure 42:
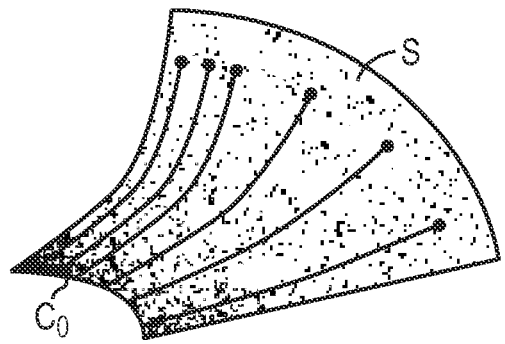
Figure 43:
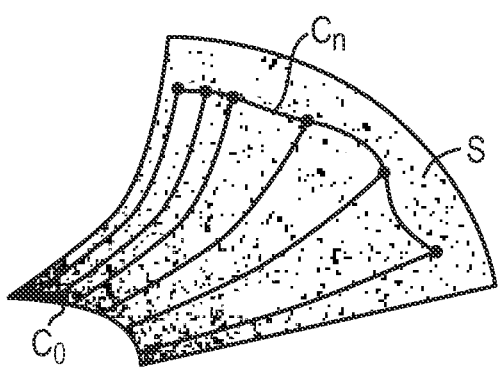
Figure 44:
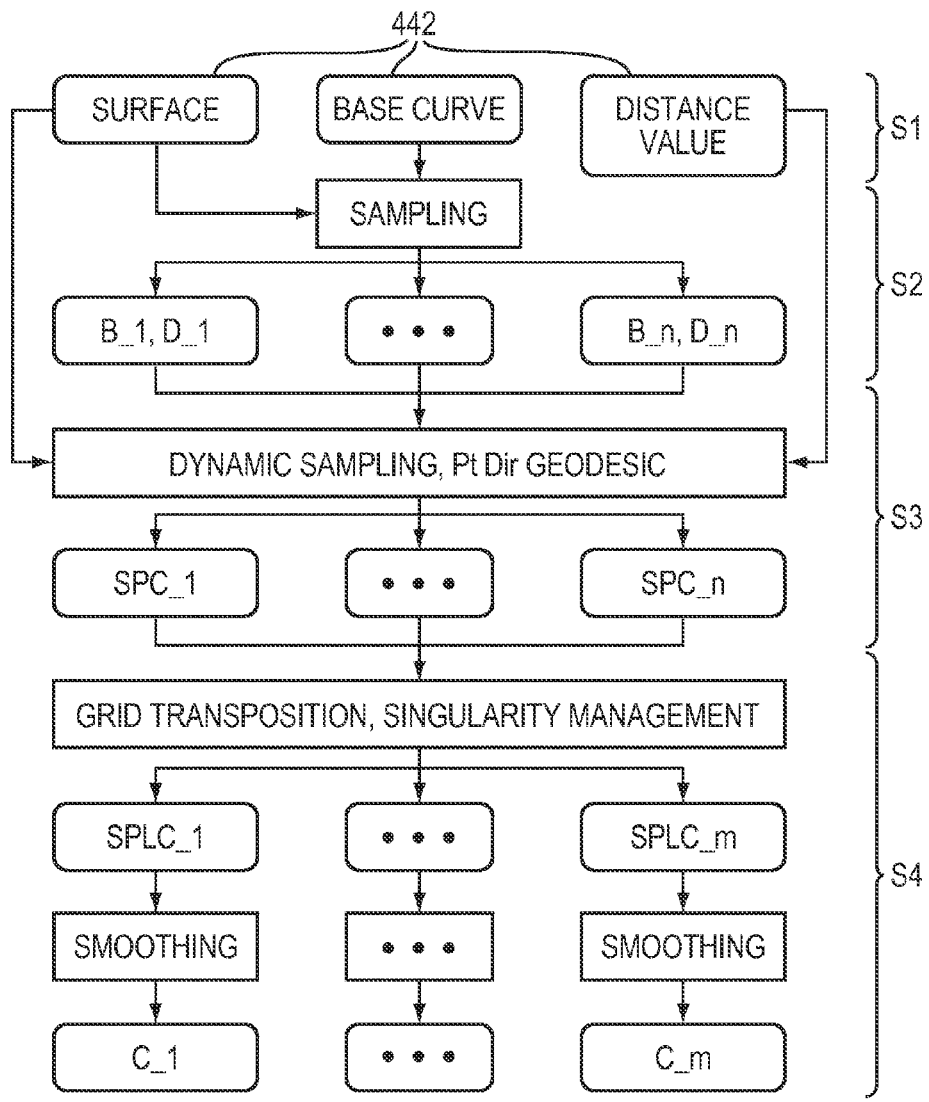
FIG. 44-47 show an example of the method.

Without any dynamic sampling, the resulting geodesic perpendicular curves network is illustrated on FIG. 42. With the base curve $C_0$ and the surface S of the example, computing a parallel geodesic curve $C_n$ by using the points 382 results in a wavy shape of the parallel curve $C_n$ as illustrated on FIG. 43. If desired, this wavy shape may be avoided by the dynamic refining process.

An example of an algorithm to refine the grid of points dynamically is provided below. The algorithm runs a simple loop through the nominal sampling and calls the refinement procedure when needed. The refinement procedure iterates as many times as necessary until the density criteria is correct. Given the step length h defining the base curve sampling, meaning that $u_{i+1}=u_i+h$, the density threshold is defined by $\epsilon:=\lambda h$, where $\lambda \geq 1$ is an internal and fixed parameter. Tests performed on industrial parts define the actual value of parameter $\lambda$. If the distance between two consecutive geodesic perpendicular curves is larger than $\epsilon$, some refinement is necessary. Function Dist(•) computes this distance. Function GeoPerp(w) creates (or retrieves) the geodesic perpendicular curve to the base curve at parameter value w. This provides:

```
P₁ := GeoPerp(u₁)
For i :=2 to n do begin
    Pᵢ := GeoPerp(uᵢ)
    If dist(Pᵢ₋₁,Pᵢ)≥ ε then Refine(uᵢ₋₁,uᵢ)
End for
```

The refinement procedure may use an internal stack to remember parameter intervals to subdivide. The input parameter interval is [s,t]. Since an interval cannot be refined indefinitely, another threshold is defined as follows. Noting k the maximum number of times an interval can be subdivided, let $h_{min} := 2^{-k} h$ be the minimum interval length. Like λ, k is an internal and fixed parameter the value of which is defined by tests performed on industrial parts. This provides:

```
Refine(s,t)
    Push(s,t)
    While the stack is not empty do begin
        Pop(s,t)
        If |t – s| ≥ h_min then
```

$$r := \frac{s+t}{2}$$

```
            Q := GeoPerp(r)
            If dist(Q,GeoPerp(t)) ≥ ε then Push(r,t)
            If dist(GeoPerp(s),Q) ≥ ε then Push(s,r)
        End if
    End while
```

Figure 45:
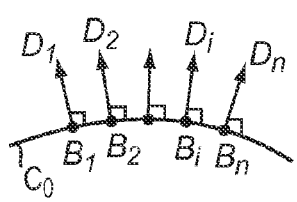
Figure 46:
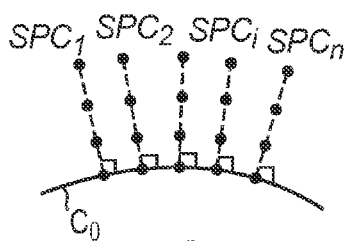
Figure 47:
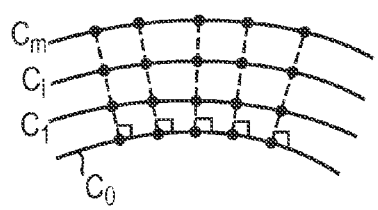

An example of the method comprising options described above is illustrated with reference to FIGS. 44-47. Provided S1 input geometrical objects 442 are the surface, the base curve $C_0$ (lying on the surface) and the distance value. After that, the first step is to sample S2 the base curve $C_0$ into a list of n base points $B_i$. This first sampling may be performed according to the local curvature radius value of the base curve $C_0$, as explained earlier. The sampling may include computing the perpendicular directions $D_i$ to the base curve at each point $B_i$. The sampling S2 is illustrated on FIG. 45.

Next step is to determine S3 a grid of points by launching n geodesic point-direction computations starting from $B_i$ and $D_i$ initial points and directions. This is performed through a dynamic sampling algorithm that is described above. This yields n (or more) sampled perpendicular geodesic curves $SPC_i$. This step of determining S3 the grid of points is illustrated on FIG. 46.

All the sampled perpendicular geodesic curves are viewed as a grid of points. To compute S4 a plurality of parallel geodesic curves, the grid of point is first transposed in order to provide m sampled parallel curves $SPLC_j$. The next step is to clean singularities on the grid of points, if any. The very last step is to smooth the sampled parallel curves in order to provide geodesic parallel curves $C_j$ as objects that can be handled by the geometric modeling system. These computations can be parallelized because they are independent. The surface is needed in the smoothing process if the p-curves associated to the parallel curves are required. Otherwise, it is not necessary. The step of computing S4 the plurality of parallel geodesic curves is illustrated on FIG. 47.

In an example, the method takes into account the overall process of generating thousands of parallel geodesic curves in the context of composites design. Given the base curve, given the number of parallel geodesic curves to compute from the said base curve and given the distance values separating the parallel geodesic curves, the algorithm starts by sampling the base curve (like the prior art algorithm). Then it computes all perpendicular geodesic curves. Each perpendicular geodesic curve is long enough to overlap all the future parallel geodesic curves. This computation yields perpendicular geodesic curves as a grid of points resulting from numerical integration. The singularity management, if any, is performed on the grid of points. Clearly, managing singularity of a curve through its polygonal interpolation is an approximation, but this approximation is acceptable in the context of composites. Points resulting from the clean grid are smoothed rather than interpolated in order to provide curves. The smoothing process is tuned in order to minimize the number of arcs for data memory purpose. Once more, the smooth curve is an approximation of the theoretical parallel geodesic curve, but this is acceptable from the composites point of view.

By involving the context of composites, the method is able to relax unwanted constraints. Doing so, and preserving robustness, the invention saves computing time and data memory. Noting m the number of geodesic parallel curves to compute, brute force algorithm is a single loop reusing m times the geodesic parallel curve computation, yielding a $o(m^2)$ computation time. The invention is a $o(m)$ algorithm when used with a single processor computer. It can be sub linear or even constant when used with a multi-processor computer.

The method saves robustness because all parallel geodesic curves are computed from the initial base curve. Imperfection amplification by reusing previous parallel geodesic curve is avoided. Performance is saved as well because each perpendicular geodesic curve is computed in one shot, which avoids computing overlapping sections. This is possible because the number of parallel geodesic curves and their distances are known a priori. This brings the overall length of perpendicular geodesic curves computed from $$\frac{m(m+1)}{2}nd$$

down to mnd. Since perpendicular geodesic curves are independent from each other, their computation can be accelerated by multi-core or parallel computing capabilities.

Singularity management is performed on polygonal lines defined by the grid of points, which is faster than precise singularity management. Traditional singularity management precisely computes the self intersection point and the tangent vectors to the self intersection point in order to provide an exact solution, which, by the way, always features a sharp vertex. These computations are not needed in the context of composites, which shortens the computation time. Furthermore, the shape of each singular portion is governed by a so called "leader point". Experiments show that the stability of leader points provides a regular network of parallel geodesic curves in the neighborhood of singularities. A characteristic of the method is that the same algorithm may be used for singularity management and for sharp vertices on the base curve, thus saving programming and yielding reliable software.

As mentioned previously, composites design precision requirement allows the smoothing process to create a smaller number of arcs, thus yielding lighter data memory. This is because the actual manufacturing process involves human operations that cannot take benefit of the full precision provided by a computer. So there is no reason to spend computing time to get an over-precise solution. In addition, light resulting curves will improve the performance of further processing, mainly curves intersection and trimming.

So far, the method has been mainly described in its application for computing a plurality of parallel geodesic curves from a base curve. However, the method may also be applied to correcting singularities that previously computed parallel geodesic curves may present. Indeed, in an example, the method may be applied when a plurality of geodesic parallel curves have already been computed and present singularities such as the ones described above, e.g. loops, sharp vertices e.g. when such loops are trimmed, or self-intersection. For example, a first designer may have computed these curves using prior art algorithms. Or a first designer may have computed the plurality of parallel geodesic curves without using any singularity correction option described earlier. In that case, a second designer, or the first designer himself, may apply the method to correct these singularities.

The first step is to provide the surface and the base curve lying on the surface. The surface is the surface on which the plurality of uncorrected parallel geodesic curves lies, and the base curve is one of the uncorrected curves which does not present a singularity or a curve obtained from one of the uncorrected curves of which singularities have been corrected by applying prior art techniques. Of course, if the curve used by the first designer as the base curve to compute the uncorrected curves is saved, it may be used. The second step consists in sampling the base curve thus provided into the list of points, the same way as explained before. The third step is to determine the grid of points of perpendicular geodesic curves. The points may be obtained by generating perpendicular geodesic curves and determining their intersection with the uncorrected curves. Levels are defined accordingly. Then, a plurality of corrected parallel geodesic curves may be computed after processing the grid of points to correct singularities, as extensively detailed earlier. The corrected part may be displayed. The method thus allows correction of singularities on previously computed parallel curves.

It is to be understood that the foregoing method can be applied to any object in any configuration capable of being defined by a CAD/CAM/CAE system, or any system used to display views of an object from varying viewpoints. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The method may be performed with a CAD system. The computer-aided design system may comprise a database storing the part modeled by using a seed structure of a context-free grammar, a set of rules of the grammar, at least two design features, each design feature being defined by at least one rule of the set, and a priority order between the design features determined by the seed structure and the set of rules; the system may further comprise a graphical user interface suitable for performing the method detailed above.

A computer program may comprise instructions for execution by a computer, the instructions comprising means for performing the method with a graphical user interface of (comprised by) a computer-aided design system. The system further comprises a database storing a part modeled by a seed structure of a context-free grammar, a set of rules of the grammar, at least two design features, each design feature being defined by at least one rule of the set, and a priority order between the design features determined by the seed structure and the set of rules. Such a program may be used to update a CAD system so that it becomes suitable for performing the method of the invention. As known from the prior art, such a program may be recorded on a computer readable storage medium.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Figure 48:
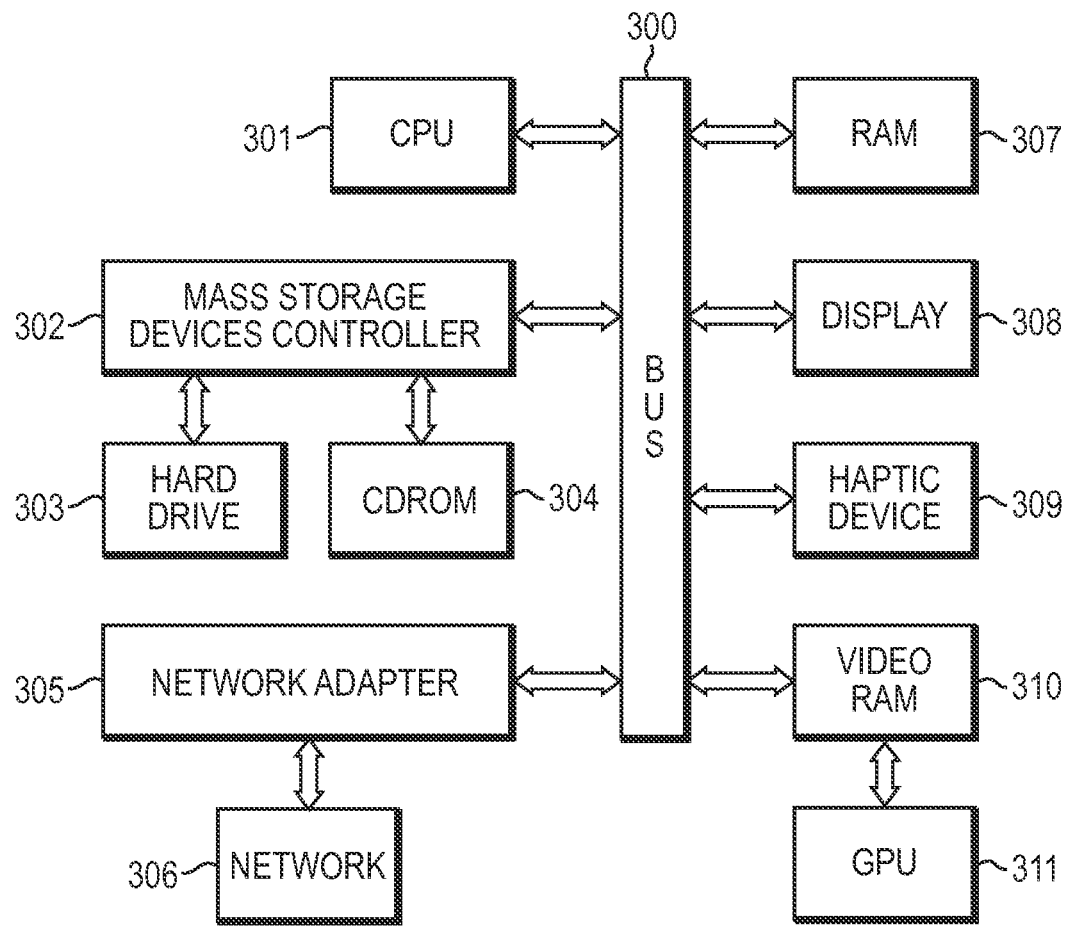
FIG. 48 shows an example of a user workstation suitable for performing the method.

FIG. 48 shows an example of a client computer system, e.g. a workstation of a user.

The client computer comprises a central processing unit (CPU) 301 connected to an internal communication BUS 300, a random access memory (RAM) 307 also connected to the BUS. The client computer is further provided with a graphical processing unit (GPU) 311 which is associated with a video random access memory 310 connected to the BUS. Video RAM 310 is also known in the art as frame buffer. A mass storage device controller 302 manages accesses to a mass memory device, such as hard drive 303. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 304. Any of the foregoing may be supplemented by, or incorporated in, specially designed ASICs (application-specific integrated circuits). A network adapter 305 manages accesses to a network 306. The client computer may also include a haptic device 309 such as cursor control device, a keyboard or the like. A cursor control device is used in the client computer to permit the user to selectively position a cursor at any desired location on display 308. In addition, the cursor control device allows the user to select various commands, and input control signals. The cursor control device includes a number of signal generation devices for input control signals to system. Typically, a cursor control device may be a mouse, the button of the mouse being used to generate the signals.

Examples of the present invention have been described. It will be understood that various modifications may be made without departing from the spirit and scope of the invention. Therefore, other implementations are within the scope of the following claims. For instance, the method of the invention has been mainly described with a step of providing a base curve and another step of sampling it. However, a sample of points may be directly provided instead, as long as enough specifications for computing the grid of points are also provided.

The invention claimed is:

1. A computer-implemented method for designing a part, wherein the computer-implemented method comprises the steps of:

providing a surface of the part and a base curve lying on the surface of the part;

sampling the base curve into a list of base points;

determining a grid of points of perpendicular geodesic curves, the points belonging to a respective level, each level corresponding to a respective geodesic distance to the base curve, wherein each perpendicular geodesic curve lies on the surface of the part and departs perpendicularly from the base curve at a respective base point; then, computing a plurality of parallel geodesic curves lying on the surface of the part by using the grid of points, each parallel geodesic curve corresponding to a respective level; and displaying a representation of the part.

2. The computer-implemented method of claim 1 wherein the step of computing the plurality of parallel geodesic curves comprises:

interpolating the points of each level, or fitting the points of each level.

3. The computer-implemented method of claim 1, wherein the computer-implemented method further comprises modifying one or more levels.

4. The computer-implemented method of claim 3, wherein:

the step of computing the plurality of parallel geodesic curves comprises interpolating the points of each level with a polygonal line, the polygonal line comprising segments formed over a sequence of points of the level; and the modifying of one or more levels comprises discarding at least one segment of the level under modification.

5. The computer-implemented method according to claim 4, wherein the modifying of one or more levels comprises:

forming vectors corresponding to segments of the level under modification, each vector having a start point and an end point, the formed vector having a corresponding base vector, formed by two points of the base curve corresponding to the start point and the end point respectively;

evaluating if the formed vectors are oriented in a same direction as the corresponding base vectors;

upon the result of the step of evaluating, determining regular segments and irregular segments of the sequence of points of the level, an irregular segment being a segment which corresponds to a vector evaluated to be oriented in a different direction from the corresponding base vector; and discarding the irregular segments from the level under modification.

6. The computer-implemented method according to claim 5, wherein the modifying of one or more levels further comprises:

forming vectors corresponding to segments of at least one other level, the formed vectors of the other level having corresponding base vectors;

evaluating if the formed vectors of the other level are oriented in a same direction as the corresponding base vectors;

upon the result of the step of evaluating for the other level, discarding regular segments from the level under modification.

7. The computer-implemented method according to claim 5, wherein the modifying of one or more levels further comprises:

determining an intersection between a first polygonal branch and a second polygonal branch, the intersection being the shortest line linking the first polygonal branch and the second polygonal branch; and discarding all the segment of the first polygonal branch after the intersection and all the segments of the second polygonal branch before the intersection wherein the first polygonal branch and the second polygonal branch, each being a sequence of regular segments of the level under modification, are separated by a sequence of previously discarded segments of the level.

8. The computer-implemented method of claim 7, wherein the modifying further comprises adding to the level under modification a leader point located on the intersection, preferably located on the middle of the intersection.

9. The computer-implemented method claim 3, wherein:

the base curve comprises a sharp vertex; and the modifying comprises adding at least one point to the level under modification, according to the position of two points of the level corresponding to two base points of the base curve on either side of the sharp vertex.

10. The computer-implemented method according to claim 1, wherein the grid of points is dynamically refined.

11. The computer-implemented method according to claim 1, wherein the part is a composite part.

12. The computer-implemented method according to claim 1, wherein at least one parallel geodesic curve comprises a sharp vertex.

13. A computer-aided design system comprising:

a database suitable for storing parameterizations of a surface of a part and a base curve lying on the surface of the part; and a graphical user interface adapted to design the part with a method implemented by the computer-aided design system, for designing the part, wherein the computer-implemented method comprises the steps of:

providing the surface of the part and the base curve lying on the surface of the part;

sampling the base curve into a list of base points;

determining a grid of points of perpendicular geodesic curves, the points belonging to a respective level, each level corresponding to a respective geodesic distance to the base curve, wherein each perpendicular geodesic curve lies on the surface of the part and departs perpendicularly from the base curve at a respective base point; then, computing a plurality of parallel geodesic curves lying on the surface of the part by using the grid of points, each parallel geodesic curve corresponding to a respective level; and displaying a representation of the part.

14. A non-transitory computer readable storage medium having recorded thereon a computer program comprising instructions for execution by a computer, the instructions comprising means for causing a computer-aided design system comprising a database, suitable for storing parameterizations of a surface of a part and a base curve lying on the surface of the part, to perform a computer-implemented method for designing the part, wherein the computer-implemented method comprises the steps of:

providing the surface of the part and the base curve lying on the surface of the part;

sampling the base curve into a list of base points;

determining a grid of points of perpendicular geodesic curves, the points belonging to a respective level, each level corresponding to a respective geodesic distance to the base curve, wherein each perpendicular geodesic curve lies on the surface of the part and departs perpendicularly from the base curve at a respective base point; then, computing a plurality of parallel geodesic curves lying on the surface of the part by using the grid of points, each parallel geodesic curve corresponding to a respective level; and displaying a representation of the part.

* * * * *

UNITED STATES PATENT AND TRADEMARK OFFICE
CERTIFICATE OF CORRECTION

PATENT NO. : 8,694,284 B2  Page 1 of 1
APPLICATION NO. : 13/070547
DATED : April 8, 2014
INVENTOR(S) : Simon Berard It is certified that error appears in the above-identified patent and that said Letters Patent is hereby corrected as shown below:

On the Title Page, Item (54) and in the Specification, Column 1, line 1, please add the following to the beginning of the title -- Design of a --

Signed and Sealed this
First Day of July, 2014

Michelle K. Lee
*Deputy Director of the United States Patent and Trademark Office*